United States Patent
Maki et al.

(10) Patent No.: US 7,116,904 B2
(45) Date of Patent: Oct. 3, 2006

(54) OPTICAL COMMUNICATIONS SYSTEM

(75) Inventors: Kouji Maki, Kawasaki (JP); Yasuo Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 742 days.

(21) Appl. No.: 10/103,896

(22) Filed: Mar. 25, 2002

(65) Prior Publication Data
US 2003/0081284 A1    May 1, 2003

(30) Foreign Application Priority Data
Oct. 31, 2001  (JP)  ............... 2001-334075

(51) Int. Cl.
*H04B 10/20* (2006.01)
*H04B 10/22* (2006.01)
*H04J 14/02* (2006.01)

(52) U.S. Cl. ............... 398/50; 398/49; 398/50; 398/51; 398/56; 398/69; 398/140

(58) Field of Classification Search ............ 398/140, 398/56, 49–51, 69
See application file for complete search history.

(56) References Cited

U.S. PATENT DOCUMENTS 5,018,130 A *  5/1991  Suzuki et al. ............ 398/51
6,459,516 B1 * 10/2002  Mizrahi et al. ........... 398/82
6,850,707 B1 *  2/2005  Chang et al. ............. 398/51

OTHER PUBLICATIONS

Japanese Abstract No. 06035012 A, dated Feb. 10, 1994.
Japanese Abstract No. 06103835 A, dated Apr. 15, 1994.

* cited by examiner

*Primary Examiner*—Kenneth Vanderpuye
*Assistant Examiner*—Danny Wai Lun Leung
(74) *Attorney, Agent, or Firm*—Staas & Halsey LLP

(57) ABSTRACT

An optical communications system which offers flexible and efficient cross-connect capabilities without using optical switch modules. With external commands, a variable wavelength setting unit varies output wavelength of each transmission unit. It also provides an output wavelength description indicating which wavelengths can be produced. An optical signal transmitter transmits an outgoing optical signal with the controlled wavelength, while an optical signal receiver receives an incoming optical signal with a single particular wavelength which have been produced through WDM processes. In a WDM unit, a WDM controller controls optical multiplexers and demultiplexers, and the resultant signals go out through optical output ports which are each associated with particular output wavelengths. In a monitoring station, an administration controller manages administrative data concerning connections and operations of transmission units, and based on that data, an optical cross-connect controller set up connections via the WDM unit, sending commands to the variable wavelength setting unit.

7 Claims, 25 Drawing Sheets

FIG. 5

T1 CONNECTABILITY MANAGEMENT TABLE

| to \ from | R1 | R2 | R3 | R4 | R5 | R6 | R7 | ---- | RN |
|---|---|---|---|---|---|---|---|---|---|
| S1 | λ1 | λ2 | λ3 | λ4 | λ5 | λ6 | — | ---- | — |
| S2 | λ1 | λ2 | λ3 | λ4 | λ5 | λ6 | — | ---- | — |
| S3 | λ1 | λ2 | λ3 | λ4 | λ5 | λ6 | — | ---- | — |
| S4 | — | — | λ3 | λ4 | λ5 | λ6 | λ7 | ---- | — |
| S5 | — | — | λ3 | λ4 | λ5 | λ6 | λ7 | ---- | — |
| S6 | — | — | λ3 | λ4 | λ5 | λ6 | λ7 | ---- | — |
| S7 | — | — | — | λ4 | λ5 | λ6 | λ7 | ---- | λN |
| ---- | ---- | ---- | ---- | ---- | ---- | ---- | ---- | ---- | ---- |
| SM | — | — | — | λ4 | λ5 | λ6 | λ7 | ---- | λN |

FIG. 11

T3 EXISTING CONNECTION MANAGEMENT TABLE

| RECEIVING TRANSMISSION UNIT | CONNECTED TRANSMISSION UNIT | ALLOCATED WAVELENGTH |
|---|---|---|
| R1 | NOT CONNECTED | — |
| R2 | NOT CONNECTED | — |
| R3 | NOT CONNECTED | — |
| R4 | S4 | $\lambda 4$ |
| R5 | NOT CONNECTED | — |
| R6 | NOT CONNECTED | — |
| R7 | — | — |
| --- | --- | --- |
| Rn | NOT CONNECTED | — |

DEFINITION OF VARIABLES

| VARIABLES USED | DESCRIPTION |
|---|---|
| conn mgr[m,n] | ARRAY OF (Sm, Rn) (CONNECTABILITY MANAGEMENT TABLE T1) |
| conn mgr cur[m,n] | ARRAY OF (Sm, Rn) (CURRENT MANAGEMENT TABLE T2) |
| MAX TX | NUMBER OF TRANSMITTERS |
| MAX RX | NUMBER OF RECEIVERS |
| rev precond[n] | TEMPORARY MEMORY FOR STORING RECEPTION STATUS |
| status crs[n] | ID OF SENDING TRANSMISSION UNIT ASSOCIATED WITH RECEIVING UNIT Rn OR "NOT CONNECTED" (FIRST PART OF EXISTING CONNECTION MANAGEMENT TABLE T3) |
| lambda crs[n] | WAVELENGTH $\lambda$ USED FOR CONNECTION OF RECEIVING UNIT Rn (SECOND PART OF EXISTING CONNECTION MANAGEMENT TABLE T3) |
| lambda top | TOP VALUE OF WAVELENGTH RANGE |
| lambda bottom | LAST VALUE OF WAVELENGTH RANGE |
| lambda grid | WAVELENGTH STEP SIZE |

FIG. 15

OPTICAL COMMUNICATIONS SYSTEM

BACKGROUND OF THE INVENTION

1. Field of the Invention

The present invention relates to an optical communications system, and more particularly to an optical communications system employing wavelength-division multiplex techniques.

2. Description of the Related Art

Wavelength-division multiplexing (WDM) techniques are widely used in today's optical communications infrastructures. The WDM technology enables many transmission signals to be carried over a single fiber-optic medium, assigning different optical wavelengths to different channels. SONET/SDH data streams, for example, are transported on a WDM network, where optical signals sent out from a multiplicity of transmission units are multiplexed (combined) into one output optical fiber for delivery to peer network equipment. At the receiving end, the signals are demultiplexed (split) into the original data streams and distributed to their destinations.

Recent WDM networks can actually convey as many optical signals as more than one hundred channels in multiplexed form, and it would not be efficient to convert them back to electrical signals for the purpose of setting and changing their delivery paths. For this reason, there has been a demand for all-optical path switching facilities using optical switches which is able to configure signal routes on an individual wavelength basis.

Researchers have developed optical switch modules as the core technology of all-optical cross connect systems. More specifically, some systems perform wavelength routing with micro-electro-mechanical systems (MEMS) mirror arrays that are combined in an appropriate way. Other systems realize path switching by changing the temperature of optical waveguides. Another solution is the system disclosed in the Unexamined Japanese Patent Publication No. 6-35012 (1994), which employs wavelength converters to alter the wavelengths of received optical signals as required. It then directs the converted signals to optical multiplexers and demultiplexers, thereby realizing optical switching.

While such optical switch modules play an essential role in conventional WDM networks, they are expensive and still immature. Development of large-scale matrix switches has been underway, but not yet in the actual use. It is therefore desired to develop an optical communications system which offers flexible and efficient optical cross-connect functions by using ordinary components instead of costly optical switch modules.

SUMMARY OF THE INVENTION

In view of the foregoing, it is an object of the present invention to provide an optical communications system which provides more flexible and efficient optical cross-connect functions, without using optical switch modules.

To accomplish the above object, according to the present invention, there is provided a wavelength-division multiplexed (WDM) optical communications system. This system comprises the following elements: a plurality of transmission units, a WDM unit, and a monitoring station. Each transmission unit comprises: a variable wavelength setting unit which varies the wavelength of an outgoing optical signal according to an external command and provides an output wavelength description indicating which wavelengths are supported; an optical signal transmitter which transmits the outgoing optical signal with the wavelength set by the variable wavelength setting unit; and an optical signal receiver which receives an incoming optical signal with a single particular wavelength, the incoming optical signal having been produced through wavelength-division multiplexing and demultiplexing processes. The WDM unit comprises: a WDM controller which controls multiplexing and demultiplexing of optical signals; and a plurality of optical output ports used to output optical signals to the transmission units, each being fixedly associated with a particular output wavelength. The monitoring station comprises: an administration controller which manages administrative data concerning connections and operations of the transmission units, and an optical cross-connect controller which controls optical cross-connects in the WDM unit by sending the external command to the variable wavelength setting unit to set up connections between the plurality of transmission units according to the administrative data managed by the administration controller.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows a connectability management table;

FIG. 11 shows an existing connection management table;

FIG. 15 shows the definition of variables;

DESCRIPTION OF THE PREFERRED EMBODIMENTS

Preferred embodiments of the present invention will be described below with reference to the accompanying drawings.

Figure 1:
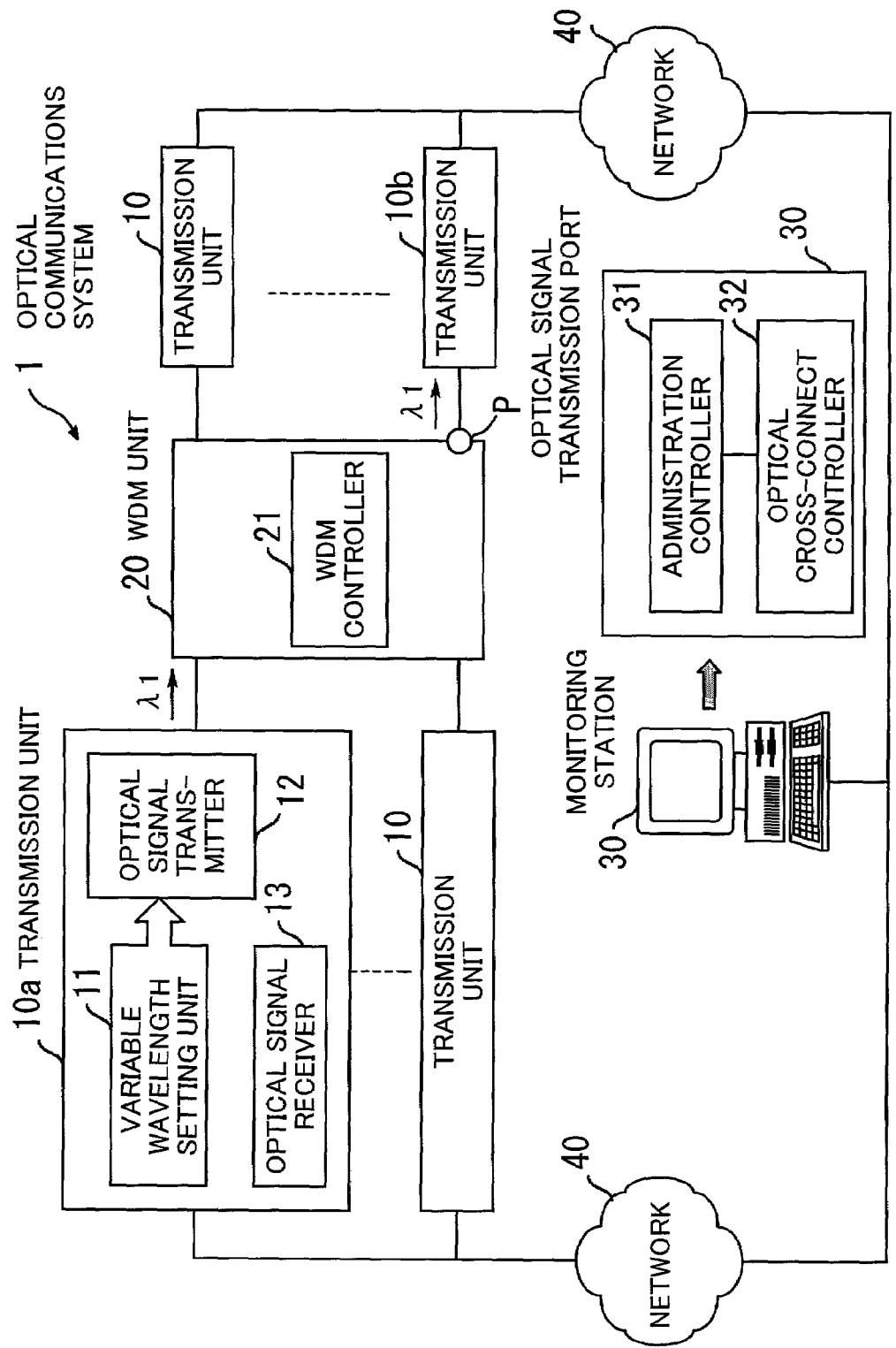
FIG. 1 is a conceptual view of an optical communications system according to the present invention.

FIG. 1 is a conceptual view of an optical communications system 1 according to the present invention. To provide WDM optical communication services, the illustrated optical communications system 1 employs a plurality of transmission units 10 (including 10a and 10b), a WDM unit 20, and a monitoring station 30. In this system 1, the monitoring station 30 communicate with the transmission units 10 through a network 40 using protocols such as TCP/IP. Each transmission unit 10 is equipped with a variable wavelength setting unit 11, an optical signal transmitter 12, and an optical signal receiver 13.

The variable wavelength setting unit 11 has tunable laser diode (TLD) functions to vary the output optical wavelength according to external commands from the monitoring station 30. The variable wavelength setting unit 11 provides the monitoring station 30 with an output wavelength description that indicates which wavelengths the transmission unit 10 can produce.

The optical signal transmitter 12 transmits an optical signal with the frequency that is set in the variable wavelength setting unit 11. The optical signal receiver 13 receives an incoming optical signal which has been processed at the WDM unit 20. Each transmission unit is allowed to receive a single optical signal with a particular wavelength that has previously been assigned to it. For example, one transmission unit can only accept a wavelength λ1, while another transmission unit is dedicated to another wavelength λ2.

The WDM unit 20 has a WDM controller 21 to multiplex optical signals received from one group of transmission units 10 shown on the left-hand side of FIG. 1 and then demultiplex the signals for distribution to their peer group shown on the right-hand side. The WDM unit 20 outputs such outgoing optical signals to the intended transmission units 10 through its optical output ports, which are each assigned a particular wavelength. Each port is used to send an optical signal with a particular wavelength that is previously determined, and there is a fixed connection between an optical output port and a transmission unit 10 for each different wavelength. More specifically, the illustrated system of FIG. 1 has an optical output port P designated to output an optical signal with a first wavelength λ1. Being designed to receive that wavelength λ1, the transmission unit 10b is connected to the optical output port P. In this way, the WDM unit 20 routes an incoming optical signal with a wavelength λa to a dedicated output port for delivery to a particular receiving transmission unit that is fixed to that port.

The monitoring station 30 includes an administration controller 31 and an optical cross-connect controller 32. As will be described in detail later, the administration controller 31 centrally manages the connections and operations of all the transmission units 10, using a connectability management table, a current connection management table, and an existing connection management table.

Based on the table contents (collectively referred to herein as "administrative data"), the optical cross-connect controller 32 issues a wavelength setting command to the variable wavelength setting unit 11 in each transmission unit 10. This is what was mentioned earlier as "external command." The optical cross-connect controller 32 interacts with the WDM unit 20 to configure its optical cross-connect functions, thereby performing path provisioning between the transmission units 10.

Suppose, for example, that the monitoring station 30 is attempting to set up a new path in the WDM unit 20 to interconnect two transmission units 10a and 10b. To achieve this, the monitoring station 30 first consults the above-mentioned tables to figure out which wavelength should be used to provide the intended connection. Since it is λ1 in this case, the monitoring station 30 then transmits a certain command over the TCP/IP network 40 to request the sending transmission unit 10a to use the wavelength λ1. In this way, a transmission path for an optical signal (λ1) is created from the sending transmission unit 10a to the receiving transmission unit 10b.

As seen from the above example, when we say in this description that the monitoring station 30 sets up a "connection," or performs "path provisioning," between transmission units, we mean that the two specified transmission units are configured to use one particular optical wavelength to deliver a transmission signal from the sending end to the receiving end.

Figure 2:
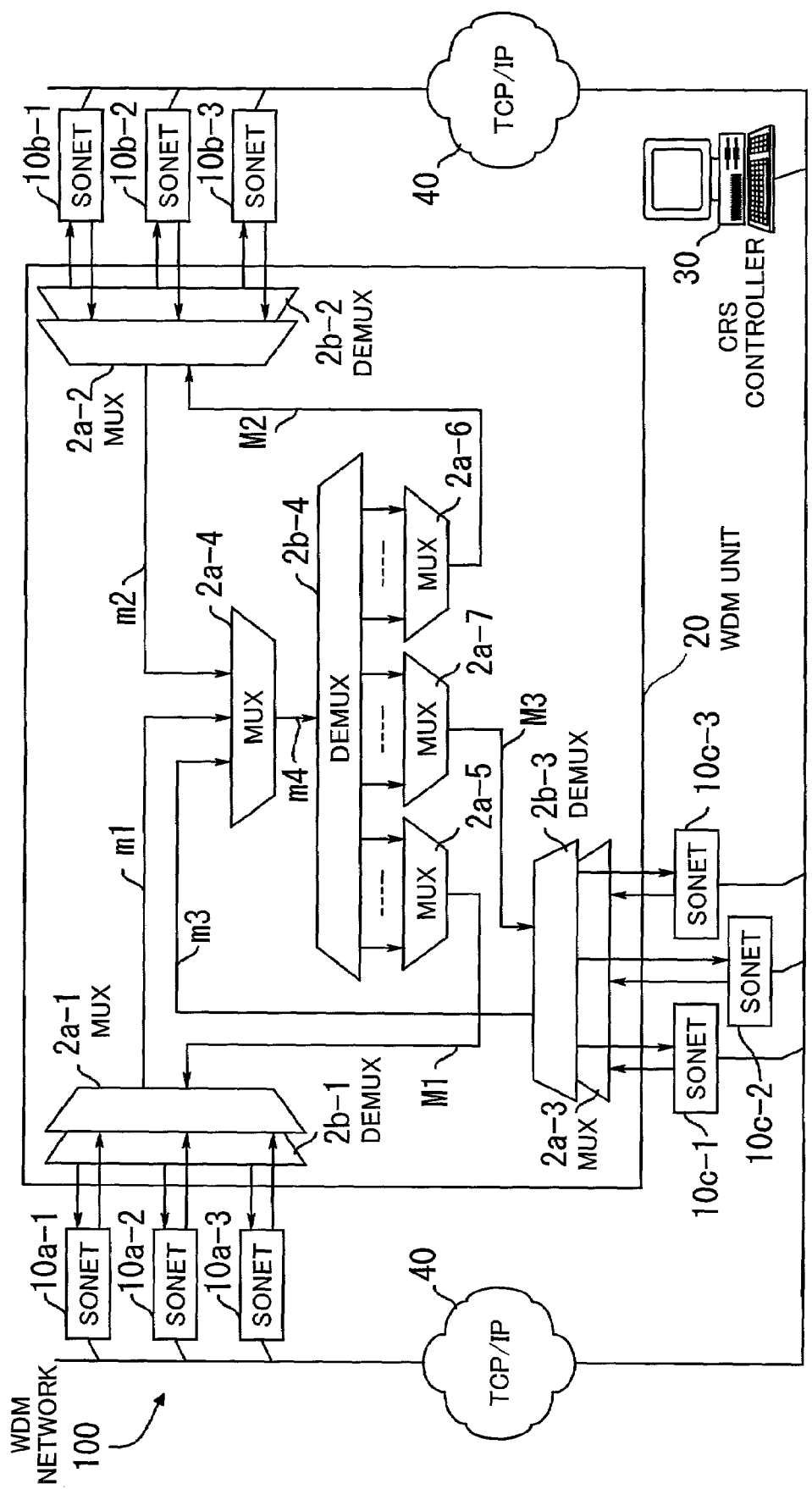
FIG. 2 shows a structure of a WDM network.
Figure 3:
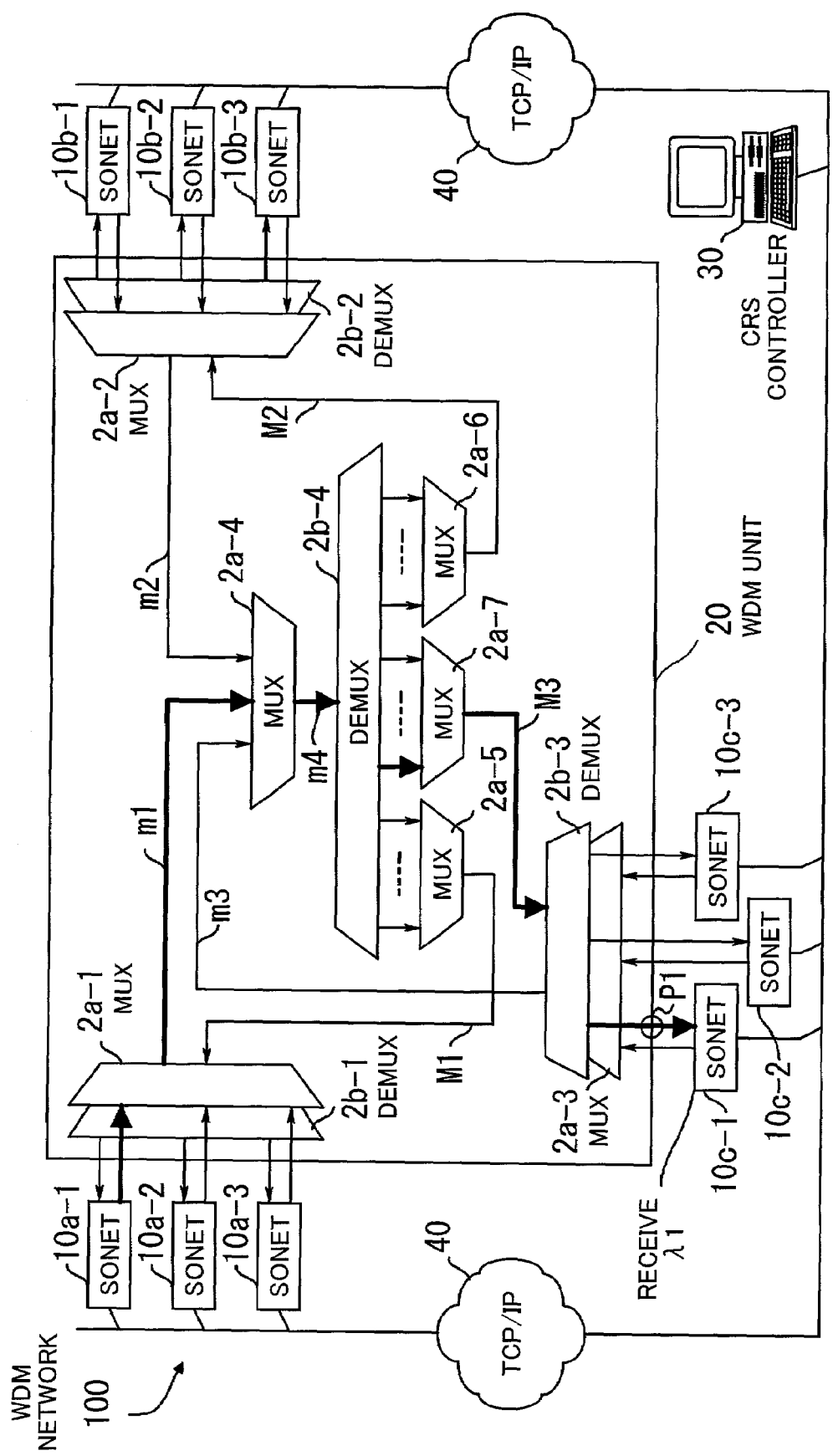
FIGS. 3 and 4 show how a connection path is set up.
Figure 4:
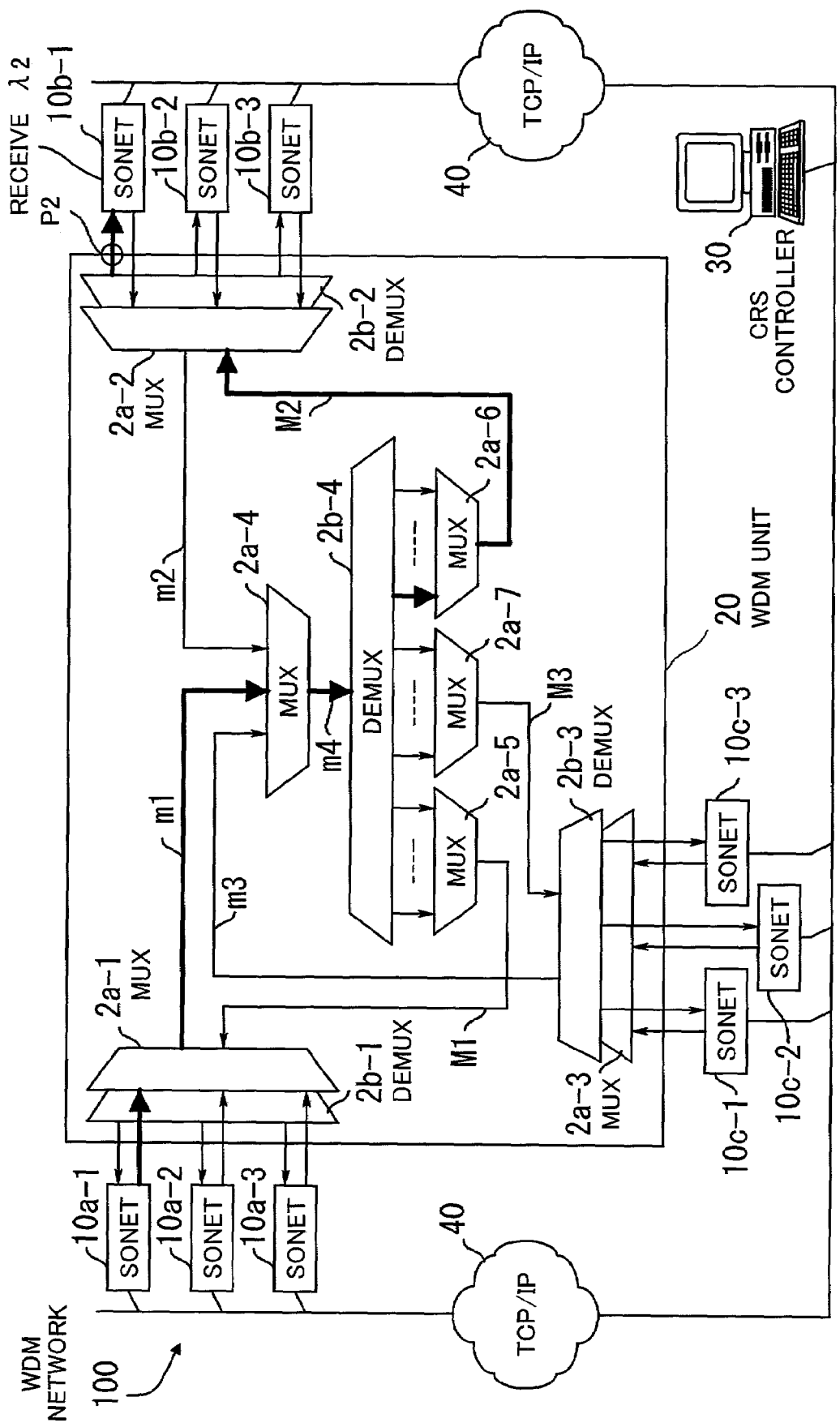

Referring next to FIGS. 2 to 4, the structure and operation of a more specific WDM network will be discussed below. FIG. 2 shows the structure of a WDM network in which the proposed optical communications system 1 is implemented. This WDM network 100 comprises the following units: a plurality of SONET transmission units 10a-1 to 10c-3, a WDM unit 20, and a CRS controller 30.

The SONET transmission units 10a-1 to 10c-3 are what have been explained as the transmission units 10 in FIG. 1. They controls transmission of SONET frames in the WDM network 100. The WDM unit 20 contains multiplexers and demultiplexers to provide the functions of the WDM controller 21. The cross-connect (CRS) controller 30 serves as the monitoring station 30 explained in FIG. 1, which administrates the entire system, particularly the configuration of optical cross-connects. The SONET transmission units interact with the CRS controller 30 through a TCP/IP network 40. The next section will describe how the illustrated system operates as a whole.

Optical signals transmitted from a first group of SONET transmission units 10a-1 to 10a-3 are combined into a first multiplexed optical signal m1 by a first multiplexer (MUX) 2a-1. Optical signals transmitted from a second group of SONET transmission units 10b-1 to 10b-3 are combined into a second multiplexed optical signal m2 by a second multiplexer 2a-2. Likewise, optical signals transmitted from a third group of SONET transmission units 10c-1 to 10c-3 are combined into a third multiplexed optical signal m3 by a third multiplexer 2a-3. There is a fourth multiplexer 2a-4 which combines those three multiplexed signals m1 to m3 into a fourth multiplexed optical signal m4.

The fourth multiplexed signal m4 is directed to a fourth demultiplexer (DEMUX) 2b-4, where it is split into individual optical signals for delivery to multiplexers 2a-5 to 2a-7. The fifth multiplexer 2a-5 combines optical signals received from the fourth demultiplexer 2b-4 and sends the resultant remultiplexed signal M1 to a first demultiplexer 2b-1. The sixth multiplexer 2a-6 combines optical signals received from the demultiplexer 2b-4 and sends the resultant remultiplexed signal M2 to a second demultiplexer 2b-2. The seventh multiplexer 2a-7 combines optical signals received from the demultiplexer 2b-4 and sends the resultant remultiplexed signal M3 to a third demultiplexer 2b-3.

The first demultiplexer 2b-1 splits the first remultiplexed signal M1 into individual signals and sends them out to their intended destinations, the first group of SONET transmission units 10a-1 to 10a-3. The second demultiplexer 2b-2 splits the second remultiplexed signal M2 into individual signals and sends them out to their intended destinations, the second group of SONET transmission units 10b-1 to 10b-3. The third demultiplexer 2b-3 splits the third remultiplexed signal M3 into individual signals and sends them out to their intended destinations, the third group of SONET transmission units 10c-1 to 10c-3.

With the above-described configuration, the fourth multiplexed signal m4 created by the fourth multiplexer 2a-4 contains optical signals from all the SONET transmission units. For this reason, some erroneous setup of wavelengths, such as duplicated wavelength allocation (e.g., the transmission units 10a-3 and 10b-3 happen to share the same wavelength $\lambda 3$), would disrupt the transmission, making it impossible to provide WDM services properly. This means that different SONET transmission units have to use different optical wavelengths when transmitting signals.

In the present invention, a path is provisioned through a process of selecting an appropriate wavelength and setting up the optical cross-connects accordingly. FIG. 3 shows how this process is executed, assuming that an optical signal has to be delivered from one SONET transmission unit 10a-1 to another SONET transmission unit 10c-1. It is also assumed here that the receiving SONET transmission unit 10c-1 is designed to receive an optical signal with a wavelength $\lambda 1$, and the sending SONET transmission unit 10a-1 can be configured to produce that wavelength $\lambda 1$.

At the outset the CRS controller 30 identifies which wavelength the receiving SONET transmission unit 10c-1 accepts, as well as whether the sending SONET transmission unit 10a-1 can produce that wavelength. In the present example, the CRS controller 30 finds out that the wavelength $\lambda 1$ would serve the purpose. The CRS controller 30 thus sends an emission start command to the SONET transmission unit 10a-1 so as to set its output wavelength to $\lambda 1$. According to this command, the SONET transmission unit 10a-1 starts emitting an optical signal with the specified wavelength $\lambda 1$. The emitted optical signal ($\lambda 1$) is routed along a path in the WDM unit 20 (as indicated by the thick arrows in FIG. 3) while being multiplexed and demultiplexed with optical signals from other transmission units. Finally, it reaches the first optical output port P1 and is sent out to the intended SONET transmission unit 10c-1.

FIG. 4 is another diagram which shows how a path is set up. Suppose here that an optical signal has to be delivered from one SONET transmission unit 10a-1 to another SONET transmission unit 10b-1, and that the receiving SONET transmission unit 10b-1 is designed to receive an optical signal with a wavelength $\lambda 2$, and the sending SONET transmission unit 10a-1 can be programmed to produce that wavelength $\lambda 2$.

As in the previous example explained in FIG. 3, the CRS controller 30 first checks which wavelength the receiving SONET transmission unit 10b-1 accepts, as well as whether the sending SONET transmission unit 10a-1 supports that wavelength. In the present case, the CRS controller 30 finds out that the wavelength $\lambda 2$ can be used for the purpose. The CRS controller 30 thus sends an emission start command to the SONET transmission unit 10a-1 so as to set its output wavelength to $\lambda 2$. According to this command, the SONET transmission unit 10a-1 starts emitting an optical signal with the specified wavelength $\lambda 2$. The emitted optical signal ($\lambda 2$) is routed along a path in the WDM unit 20 (as indicated by the thick arrows in FIG. 4) while being multiplexed and demultiplexed with similar signals from other transmission units. Finally, it reaches the second optical output port P2 and is sent out to the intended SONET transmission unit 10b-1.

In the way described above, the proposed WDM network 100 provides flexibility in the control of optical cross-connects by enabling the CRS controller 30 to specify the output wavelengths of the transmission units 10. Unlike conventional systems, the present invention eliminates the use of expensive optical switch modules, thus reducing the cost required in constructing a high-quality WDM network system.

Referring next to FIGS. 5 to 11, the following section will explain how the administration controller 31 uses its internal tables to execute operations management tasks. As mentioned earlier, the administration controller 31 maintains three tables for managing the connections between transmission units 10 and their operations, which are named: "connectability management table," "current connection management table," and "existing connection management table."

Referring now to FIG. 5, the connectability management table will be explained first. The illustrated connectability management table T1 is organized as a matrix with rows representing sending transmission units S1 to Sm and columns representing receiving transmission units R1 to Rn. Each cell of this table T1 indicates the connectability between a sending transmission unit Sm (m=1,2, . . . M) and a receiving transmission unit Rn (n=1,2, . . . N), where M is the total number of sending transmission units and N is that of receiving transmission units. When a particular transmission unit pair (Sm, Rn) can be connected with each other, the corresponding cell (m, n) is filled out with a specific wavelength value $\lambda x$ to be used for that connection. When the pair (Sm, Rn) is not connectable, the cell (m, n) is written a hyphen ("-").

More specifically, the connectability management table T1 of FIG. 5 indicates that the first sending transmission unit S1 suports six different wavelengths $\lambda 1$ to $\lambda 6$ for optical transmission and can be connected to either of the first six receiving transmission units R1 to R6 by selecting an appropriate wavelength from among them. For example, the sending transmission unit S1 will use $\lambda 4$ to communicate with the fourth receiving transmission unit R4. The illustrated table T1 also shows that the transmission unit S1 cannot be connected to the remaining units R7 to RN.

Figure 6:
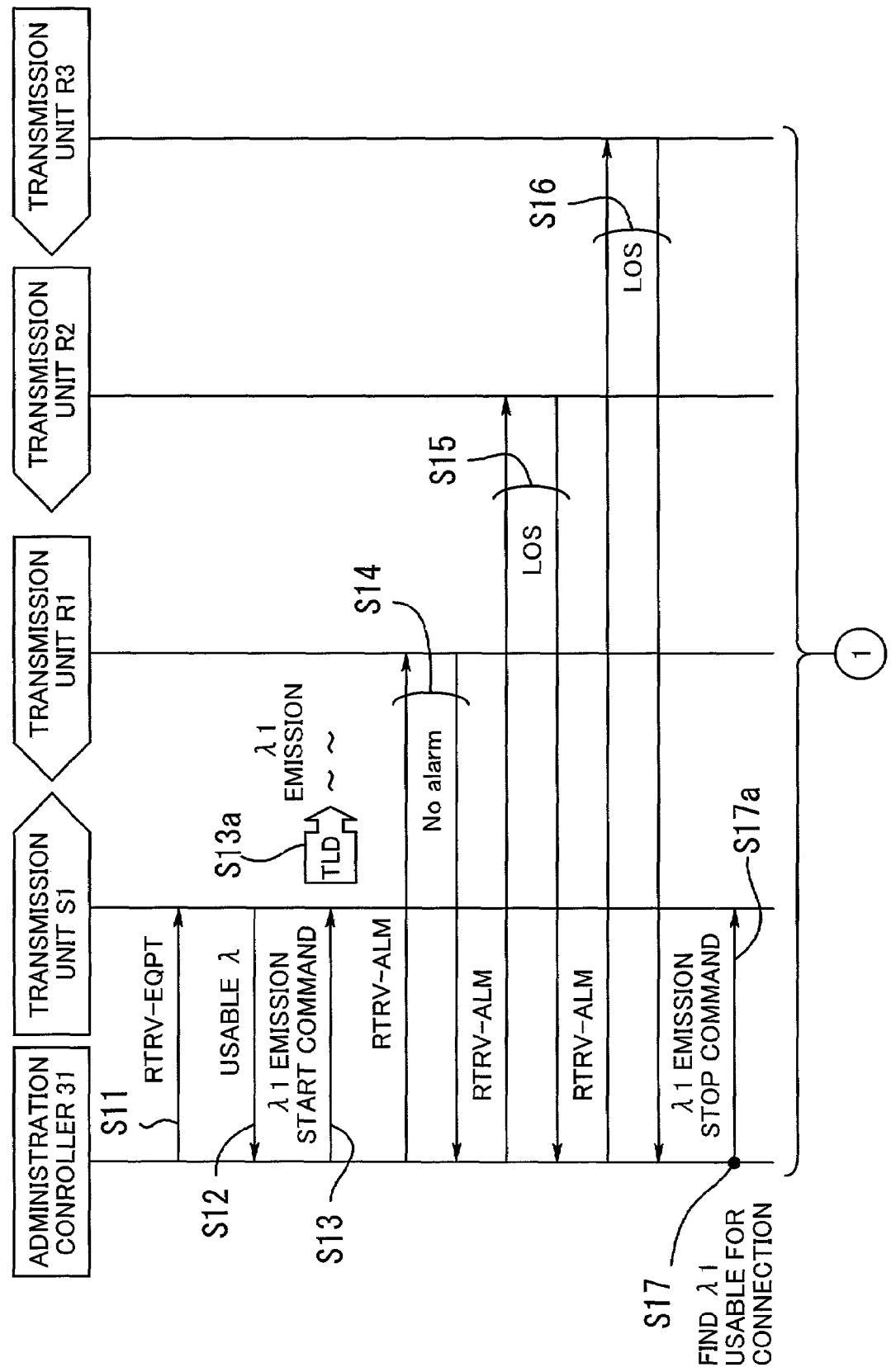
FIGS. 6 and 7 are a sequence diagram showing a process to create a connectability management table.
Figure 7:
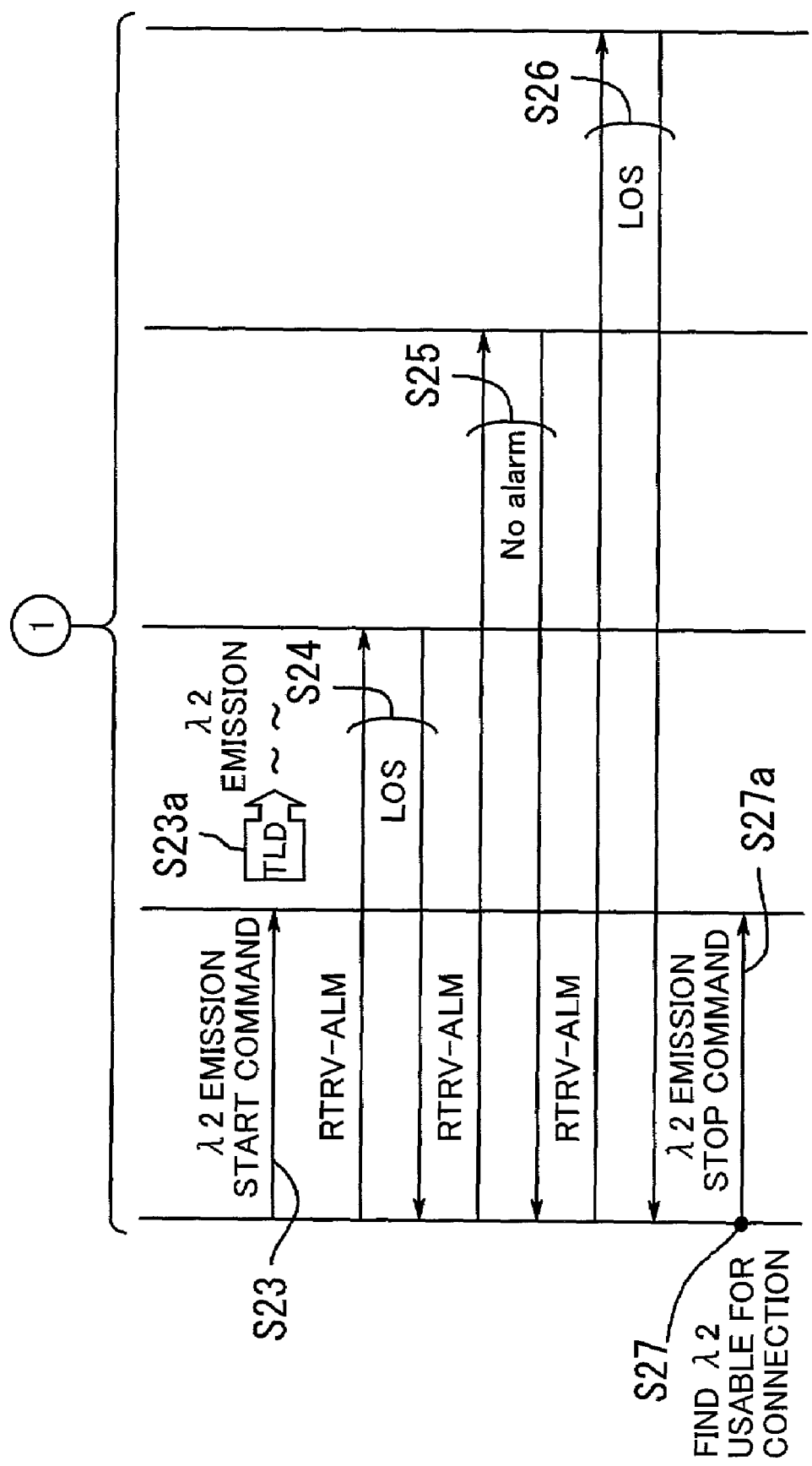

Referring next to FIGS. 6 and 7, the process of creating a connectability management table T1 will be explained. FIGS. 6 and 7 are a sequence diagram of this process. For simplicity, the following explanation will focus on the interactions between one sending transmission unit S1 and three receiving transmission units R1 to R3, although there exist more receiving transmission units.

(S11) The administration controller 31 transmits an output wavelength data collection command "RTRV-EQPT" to the transmission unit S1 to request information about which wavelengths ($\lambda$) can be produced by its local variable wavelength setting unit 11.

(S12) The transmission unit S1 informs the monitoring station 30 of its supported output wavelengths. It is assumed in the present example that the sending transmission unit S1 supports two wavelengths, $\lambda 1$ and $\lambda 2$.

(S13) Based on the received wavelength information (also referred to herein as "output wavelength description"), the administration controller 31 first gives a $\lambda 1$ emission start command to the sending transmission unit S1.

(S13a) The transmission unit S1 configures its TLD to emit an optical signal at the specified wavelength $\lambda 1$.

(S14) The administration controller 31 now wishes to know whether the optical signal (λ1) is received by the transmission units R1 to R3. It first sends a status polling command "RTRV-ALM" to the first receiving transmission unit R1. The transmission unit R1 responds to this command by returning a "No Alarm" message, indicating valid reception of the optical signal (λ1).

(S15) The administration controller 31 transmits an RTRV-ALM command to the second receiving transmission unit R2. This command results in a report of "Loss of Signal" (LOS) defect, which indicates that the transmission unit R2 is not receiving the optical signal (λ1) in question.

(S16) The administration controller 31 further transmits an RTRV-ALM command to the third receiving transmission unit R3. The transmission unit R3 also returns LOS.

(S17) From the above results of steps S14 to S16, the administration controller 31 learns that the sending transmission unit S1 can reach the first receiving transmission unit R1 by using the optical wavelength λ1. It therefore writes the wavelength value λ1 into the corresponding cell (S1, R1) in the connectability management table T1.

(S17a) The administration controller 31 sends an emission stop command to the sending transmission unit S1, thus terminating the transmission of the optical signal (λ1).

(S23) Referring again to the output wavelength information received at step S12, the administration controller 31 gives a λ2 emission start command to the sending transmission unit S1.

(S23a) The transmission unit S1 configures its TLD to emit an optical signal at the specified wavelength λ2.

(S24) The administration controller 31 transmits an RTRV-ALM command to the first receiving transmission unit R1. This command results in an LOS message indicating that the transmission unit R1 is not receiving the optical signal (λ2) in question.

(S25) The administration controller 31 then transmits an RTRV-ALM command to the second receiving transmission unit R2. The transmission unit R2 responds to this command by returning a "No Alarm" message, indicating valid reception of the optical signal (λ2).

(S26) The administration controller 31 transmits an RTRV-ALM command to the third receiving transmission unit R3. The transmission unit R3 returns an LOS message indicating that it is not receiving the optical signal (λ2) in question.

(S27) From the above results of steps S24 to S26, the administration controller 31 identifies that the sending transmission unit S1 can reach the second receiving transmission unit R2 by using the optical wavelength λ2. It therefore writes the wavelength value λ2 into the corresponding cell (S1, R2) in the connectability management table T1.

(S27a) The administration controller 31 sends an emission stop command to the sending transmission unit S1, thus terminating the transmission of the optical signal (λ2).

The monitoring station 30 executes such processing steps with respect to all the existing transmission units 10 before the system starts to provide services. The connectability management table T1 of FIG. 5 is compiled from the information collected in this way.

Figure 8:
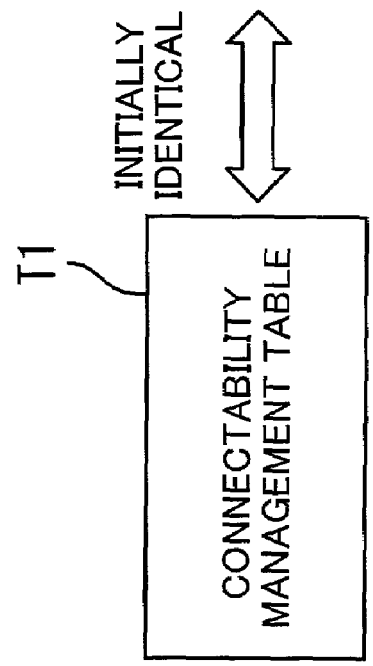
FIG. 8 shows a current management table.

Referring next to FIG. 8, the current connectability management table (shortened to "current management table") T2 will be explained. The current management table T2 has the same structure as the above-described connectability management table T1 for use in the connectability management of transmission units when the system is in operation. The current management table T2 is updated during the system operations, while the connectability management table T1 is maintained as it is, as the master copy.

The current management table T2 is used as follows when a connection between two transmission units Sm and Rn has to be set up. The administration controller 31 first consults the connectability management table T1 to find an entry relevant to the given transmission unit pair (Sm, Rn). Suppose that the table entry contains the wavelength λx. The administration controller 31 then searches the current management table T2 to determine whether there are any entries having the value λx. If such entries are found, the administration controller 31 replaces all of them with hyphens, so that the same wavelength λx will not be allocated to other connections erroneously. If there is no such entry in the current management table T2, it means that the two transmission units Sm and Rn cannot be connected.

Figure 9:
FIG. 9 shows how the current management table is used to control a process of setting up a connection.

FIG. 9 shows how the current management table T2 is updated during the process of establishing a connection between two transmission units S4 and R4. Consulting first the connectability management table T1, the administration controller 31 recognizes that the wavelength λ4 should be used to create a connection between the given transmission unit pair (S4, R4). The administration controller 31 then searches the current management table T2 to determine whether there are any entries having the value λ4. The left half of FIG. 9 shows the present state of the current management table T2, which includes λ4 entries. Accordingly, the administration controller 31 changes all those entries, including the cell (S4, R4), from "λ4" to "-" (hyphen), as shown in the right half of FIG. 9. When the administration controller 31 has made such an update to the current management table T2, the optical cross-connect controller 32 commands the sending transmission unit S4 to emit an optical signal at the wavelength λ4, thus establishing the S4-R4 connection.

In the above processing, all the λ4-valued entries are removed from the current management table T2 for the following reason. Recall that different transmission units have to use different wavelengths (as discussed in FIG. 2), while the wavelength λ4 is potentially open to transmission units other than the transmission unit pair (S4, R4). If another transmission unit pair (Sy, Rz) was connected after the transmission unit pair (S4, R4), their optical signals would conflict in a multiplexer in the WDM unit 20, causing a problem in transmission service quality. It is therefore required to prevent the same wavelength resource from being allocated simultaneously to two or more connections, and this is accomplished by removing (or entering "-" to) all relevant entries in the current management table T2 when using a wavelength λx to connect a particular transmission unit pair (Sm, Rn).

Figure 10:
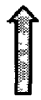
FIG. 10 shows how the current management table is used to control the process of releasing an existing connection.

FIG. 10 shows how the current management table T2 is updated in the process of releasing the existing connection between transmission units S4 and R4. In an attempt to release the S4-R4 connection, the administration controller 31 first consults the existing connection management table (described later), which reveals that the wavelength λ4 is used at present to connect a transmission unit pair (S4, R4). The administration controller 31 then searches the connectability management table T1 to determine whether there are such entries that contain the wavelength value λ4. Having successfully identified the relevant entries, the administration controller 31 restores the current management table T2 by entering λ4 to the same cell locations as those in the connectability management table T1, the master copy the current management table T2. After the administration controller 31 has finished the above task, the optical cross-connect controller 32 commands the sending transmission unit S4 to stop emitting the optical signal (λ4) and release the S4-R4 connection.

Referring next to FIG. 11, the existing connection management table T3 will be explained. The existing connection management table T3 is a table that shows the current state of connections between transmission units. It has three columns entitled as follows: "Receiving Transmission Unit," "Connected Transmission Unit," and "Allocated Wavelength." The second column "Connected Transmission Unit" contains the names of sending transmission unit associated with the receiving transmission units found in the first column "Receiving Transmission Unit."

The existing connection management table T3 of FIG. 11 tells us that the first receiving transmission unit R1 has neither a connection established nor a wavelength allocated, as indicated by the hyphen in the rightmost cell. It also shows that the fourth receiving transmission unit R4 is currently connected to the fourth sending transmission unit S4 using a wavelength λ4. The monitoring station 30 can identify every existing connection from this table T3 and thus avoids duplicated use of wavelength resources.

Referring next to FIGS. 12 to 25, the subsequent sections will present detailed functions of the monitoring station 30. The monitoring station 30 is constructed on a personal computer or workstation platform with TCP/IP interface functions. Every transmission unit 10 is also equipped with a similar TCP/IP interface, which makes it possible for them to exchange TL1 messages with the transmission units 10 over the TCP/IP network 40. TL1 refers to "Transaction Language 1," a widely used network management protocol which is stipulated as part of Generic Requirements (GR) standards in North America.

Figure 12:
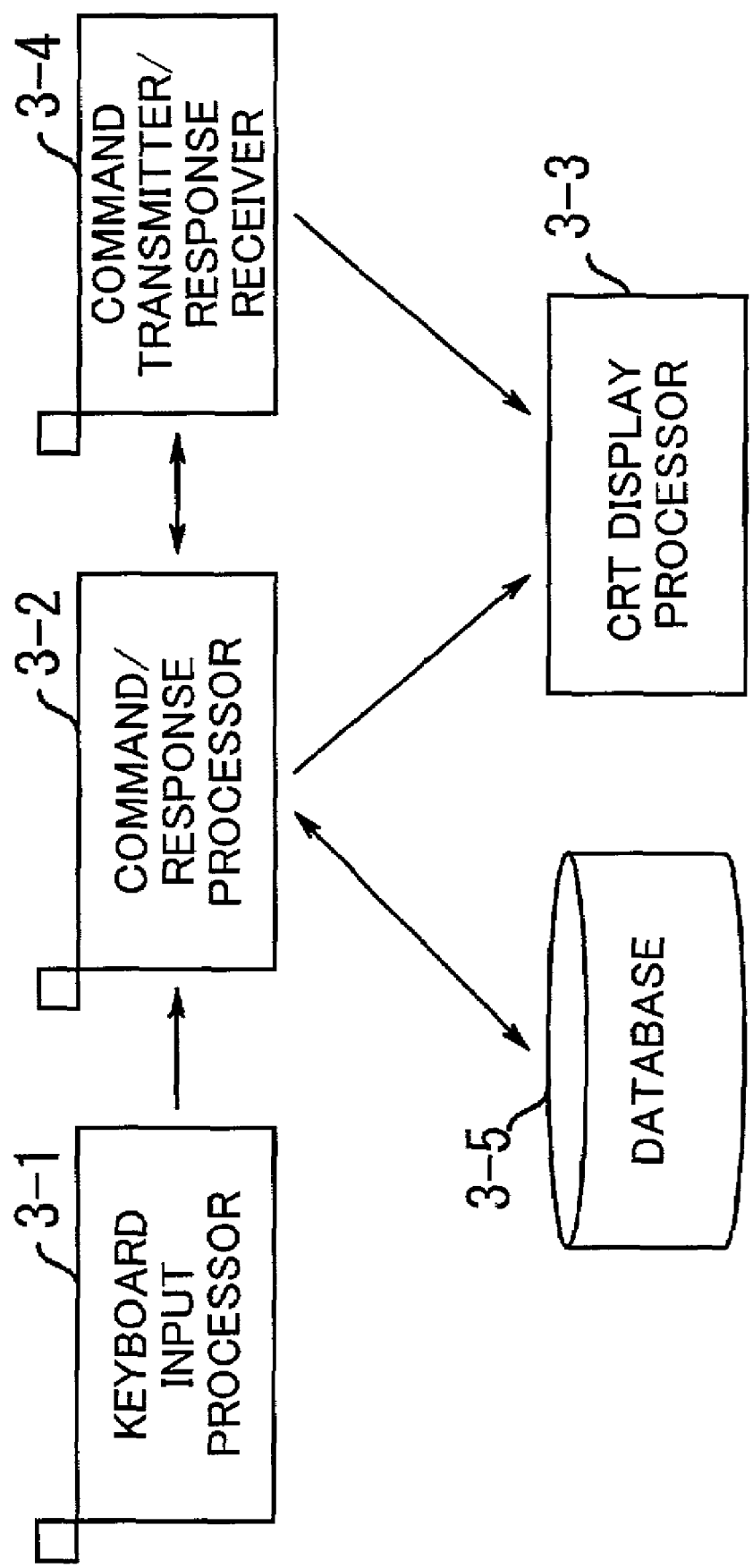
FIG. 12 is a block diagram showing a functional structure of a monitoring station.

FIG. 12 is a block diagram showing a functional structure of the monitoring station 30. The monitoring station 30 has the following elements: a keyboard input processor 3-1, a command/response processor 3-2, a cathode ray tube (CRT) display processor 3-3, a command transmitter/response receiver 3-4, and a database 3-5.

The keyboard input processor 3-1 is responsible for handling keyboard inputs from a maintenance engineer sitting at the monitoring station 30. When "Enter" key on the keyboard is hit, the keyboard input processor 3-1 interprets it as the entry of a specific command and passes the command to the command/response processor 3-2. The command/response processor 3-2 parses such typed commands and sends the result to the command transmitter/response receiver 3-4. The database 3-5 stores records of parsed commands and created tables. The CRT display processor 3-3 controls data outputs to a CRT display according to CRT display requests received from the command/response processor 3-2 or command transmitter/response receiver 3-4.

The command transmitter/response receiver 3-4 interfaces with transmission units 10, sending commands and receiving responses. More specifically, the command transmitter/response receiver 3-4 forwards a command from the command/response processor 3-2 to the intended transmission units 10. Further, when a response message is received, it delivers the message to the command/response processor 3-2, as well as sending a display request to the CRT display processor 3-3.

Figure 13:
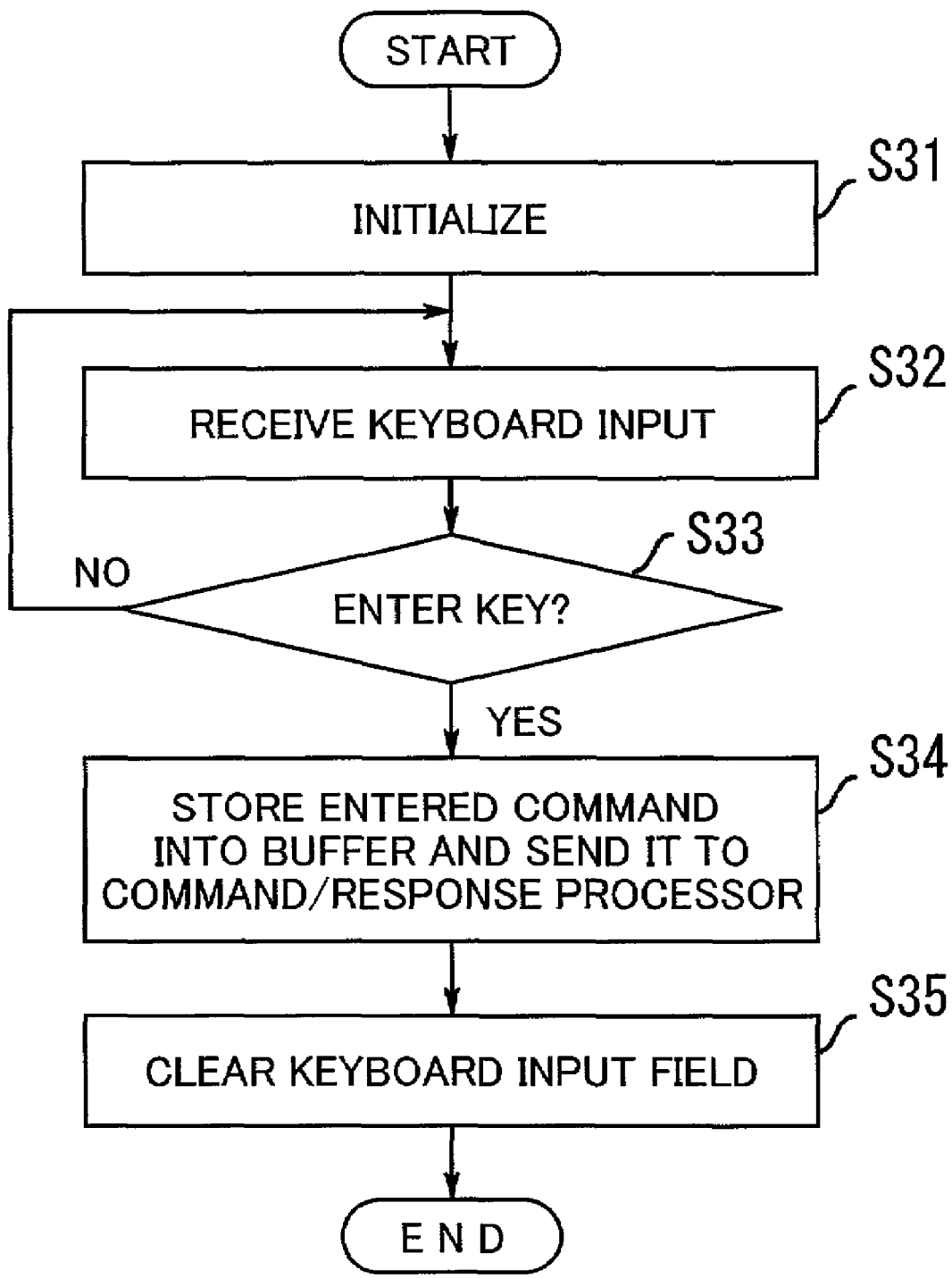
FIG. 13 is a flowchart showing the operation of a keyboard input processor.

FIG. 13 is a flowchart showing the operation of the keyboard input processor 3-1, which comprises the following steps:

(S31) Upon power-up of the monitoring station 30, the keyboard input processor 3-1 starts with an initialization task. The cursor is placed at the bottommost line of the CRT screen, prompting the maintenance engineer to enter a command.

(S32) The maintenance engineer types in a command through the keyboard, and the keyboard input processor 3-1 receives it.

(S33) The keyboard input processor 3-1 determines whether the "Enter" key is hit (which means the entry of a certain command line is finished). If so, the process advances to step S34. Otherwise, the process returns to step S32.

(S34) The entered command is stored in a buffer and transmitted to the command/response processor 3-2. If the previous command has not been finished, the transmission of the new command is suspended until the completion is flagged.

(S35) The keyboard input processor 3-1 clears out the keyboard input field and resets the cursor to the default position, thus entering the state awaiting the next command entry.

Figure 14:
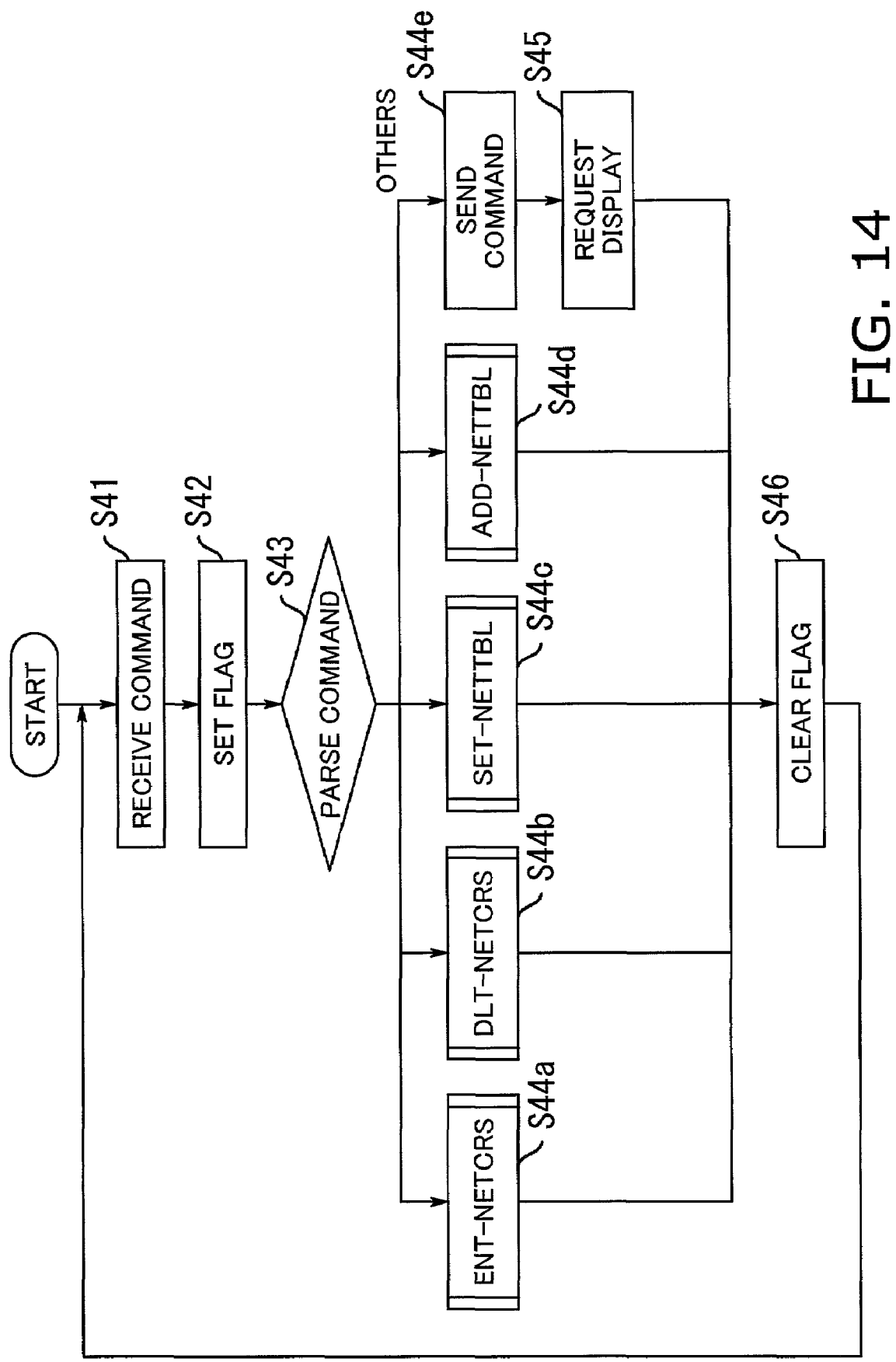
FIG. 14 is a flowchart showing the operation of a command/response processor.

FIG. 14 is a general flowchart showing the operation of the command/response processor 3-2, which has the following steps:

(S41) The command/response processor 3-2 waits for a command from the keyboard input processor 3-1.

(S42) When a specific command is received, the command/response processor 3-2 sets a command-in-process flag. When this flag is set, the keyboard input processor 3-1 is not allowed to feed a new command to the command/response processor 3-2.

(S43) The command/response processor 3-2 parses the given command and initiates an appropriate task accordingly. That is, either of the following steps S44a to S44e will be executed selectively, depending on the command name.

(S44a) The command/response processor 3-2 executes a command "ENT-NETCRS:<TID>:A,B:<CTAG>:" and proceeds to step S46. Here, ENT-NETCRS is the name of a command for setting up a connection from one transmission unit A to another transmission unit B (described later in FIG. 21). TID stands for "Target ID," which is followed by the identifiers A and B of the transmission units of interest. CTAG means "Command TAG," which is the serial number assigned to every command.

(S44b) The command/response processor 3-2 executes a command "DLT-NETCRS:<TID>:A,B:<CTAG>:" and proceeds to step S46. This is a connection release command which cancels and releases an existing connection from one transmission units A to another transmission unit B. The details of this command will be described later in FIG. 23.

(S44c) The command/response processor 3-2 executes a command "SET-NETTBL:<TID>::<CTAG>:" and proceeds to step S46. This command is used to create a connectability management table T1, the details of which will be described later in FIGS. 16 and 17.

(S44d) The command/response processor 3-2 executes a command "ADD-NETTBL:<TID>::<CTAG>:" and proceeds to step S46. This command is used when adding a new transmission unit to the WDM network, the details of which will be described later in FIG. 25.

(S44e) For other commands, the command/response processor 3-2 requests the command transmitter/response receiver 3-4 to transmit them.

(S45) The command/response processor 3-2 asks the CRT display processor 3-3 to display the command to be transmitted.

(S46) The command/response processor 3-2 clears the command-in-process flag and returns to step S41 to get ready for another incoming command.

Referring next to FIG. 15 and subsequent drawings, the next section will explain the operation of the monitoring station 30 in greater detail. FIG. 15 shows the definition of variables which will appear in the following explanation.

Figure 16:
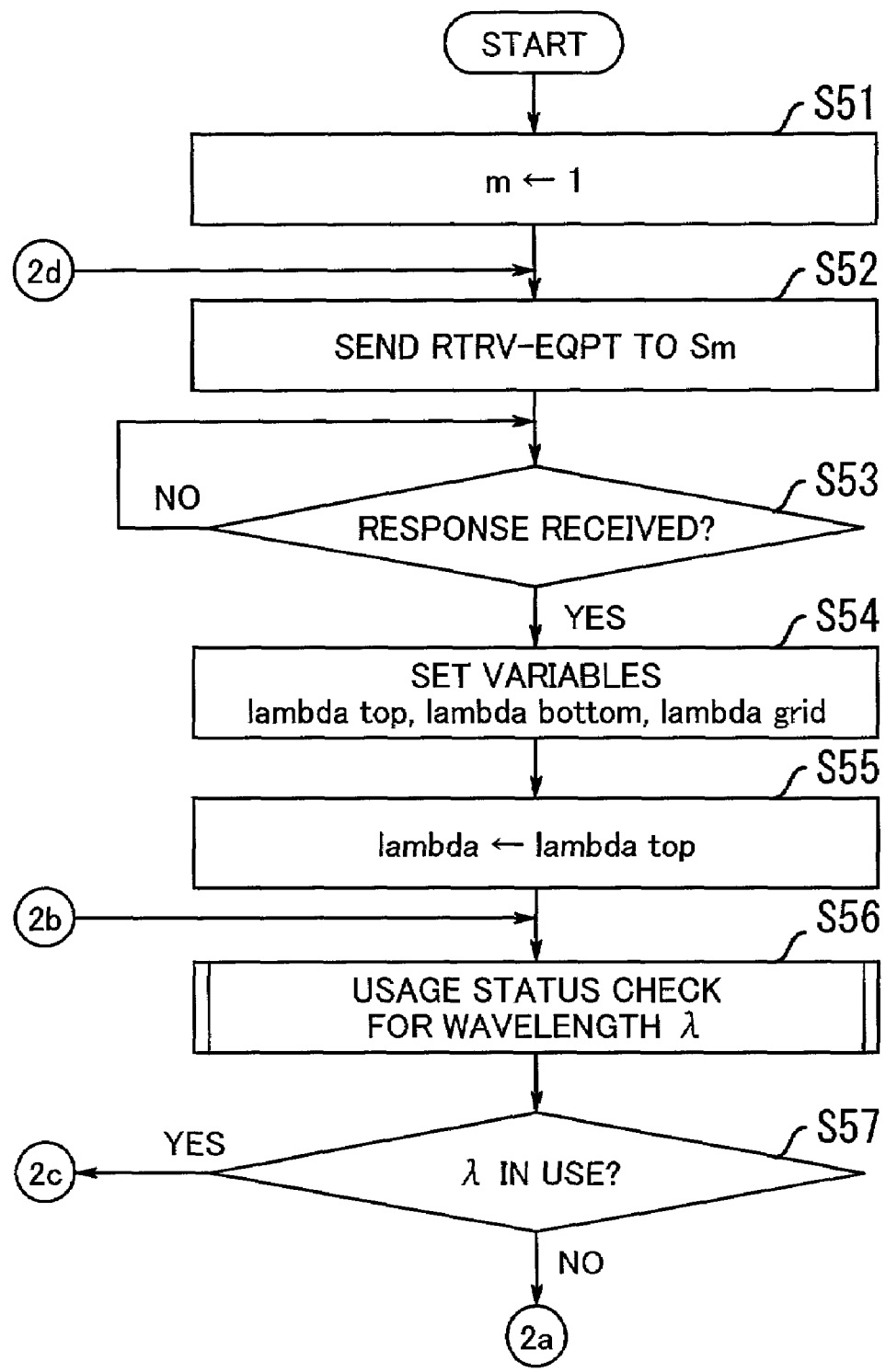
FIGS. 16 and 17 show a flowchart of a process to create a connectability management table.
Figure 17:
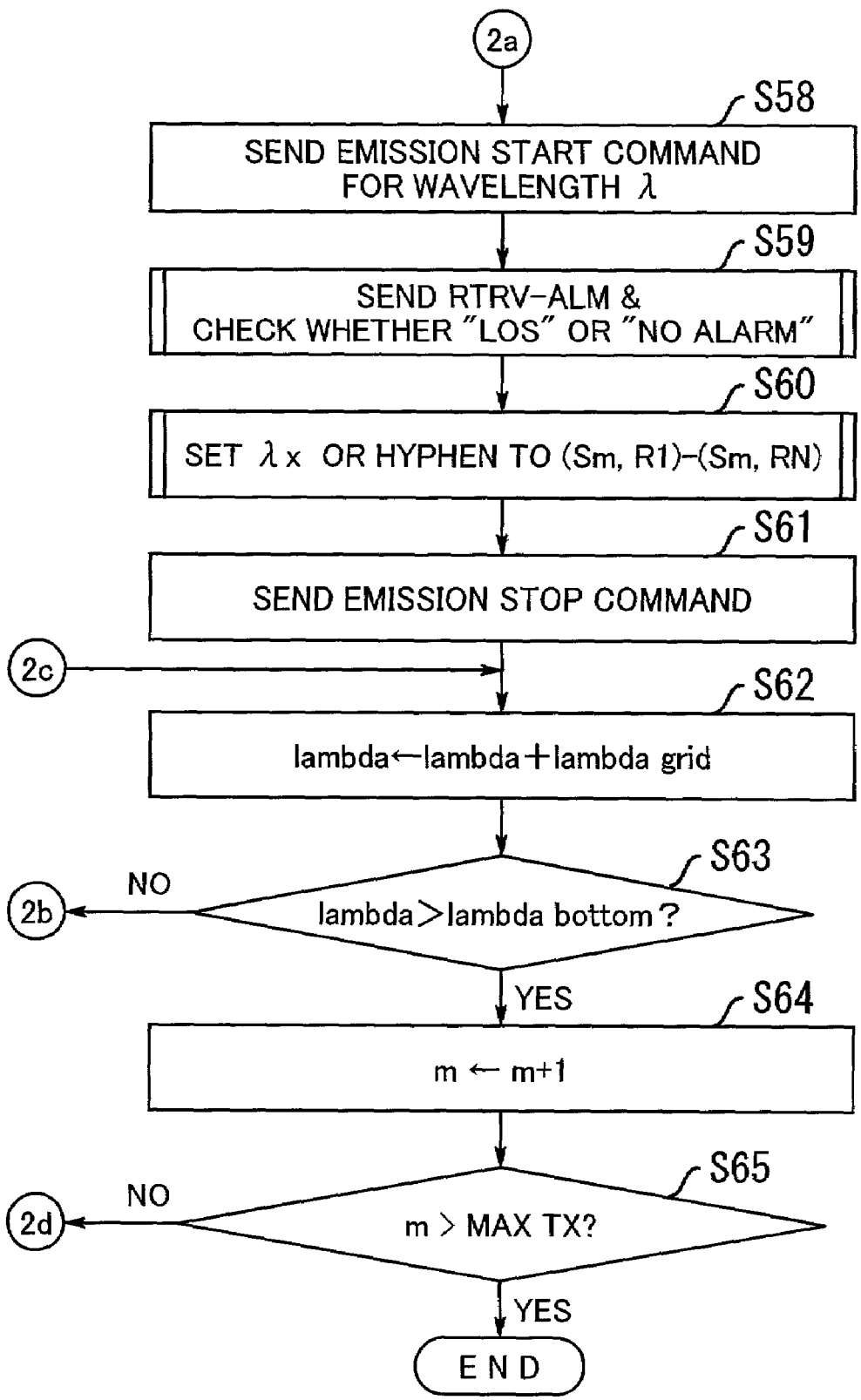

FIGS. 16 and 17 show a flowchart of a process to create a connectability management table T1. This process is called when a command "SET-NETTBL:<TID>::<CTAG>:" is given at step S44c (FIG. 14), which comprises the following steps:

(S51) The counter value m, which will serve as an index pointing to a sending transmission unit, is initialized to one.

(S52) The command/response processor 3-2 transmits an output wavelength information collection command "RTRV-EQPT" to the m-th sending transmission unit Sm, requesting it to report which optical wavelengths are supported.

(S53) The command/response processor 3-2 waits for a response to the RTRV-EQPT command. If there is a response, it proceeds to step S54.

(S54) Analyzing the response, which includes a range and step size of wavelengths supported, the command/response processor 3-2 assigns the top wavelength value to "lambda top," the last wavelength value to "lambda bottom," and the wavelength step size to "lambda grid." Suppose, for example, that the transmission unit Sm can output λ4, λ6, and λ8. In this case, the variables "lambda top," "lambda bottom," "lambda grid" are set to λ4, λ8, and 2, respectively.

(S55) The command/response processor 3-2 initializes the variable "lambda" by copying the value of "lambda top." This "lambda" represents a wavelength under test.

(S56) Consulting the existing connection management table T3, the command/response processor 3-2 checks whether the wavelength λ represented by the variable "lambda" is already used in the WDM network. The details of this step will be described later in FIG. 18.

(S57) If the wavelength λ is in use, the process skips to step S62. If not, the process advances to step S58.

(S58) The command/response processor 3-2 commands the m-th sending transmission unit Sm to output an optical signal with the wavelength λ specified by the variable "lambda." It actually uses a command "ED EQPT::<TID>:<AID>:<CTAG>:::LAMBDA, LASER:" for this purposes. Here, "ED EQPT" means an emission start command, and "AID" stands for "Access ID" which represents the unit identifier of the optical transmitter unit in the transmission unit Sm. "LAMBDA" is a field for specifying the wavelength λ. "LASER" is a switch which is set to "ON" to start emission or to "OFF" to stop emission.

(S59) In an attempt to know whether the optical signal (λ) is received by the receiving transmission units R1 to RN, the command/response processor 3-2 sends a status polling command "RTRV-ALM" to them and examines their responses, "LOS" or "No Alarm." The details of this step will be described later in FIG. 19.

(S60) Based on the result of step S59, the command/response processor 3-2 fills out the cells (Sm, R1) to (Sm, RN) of the connectability management table T1 with λx or a hyphen. The details of this step will be described later in FIG. 20.

(S61) The command/response processor 3-2 commands the m-th sending transmission unit Sm to stop the signal emission, which was initiated at step S58.

(S62) The command/response processor 3-2 adds "lambda grid" to "lambda," thereby yielding the next wavelength.

(S63) If the new value of "lambda" exceeds "lambda bottom" which represents the upper limit of the wavelength range, the process advances to step S64. Otherwise, the process returns to step S56.

(S64) The command/response processor 3-2 increments the counter m by one.

(S65) If the counter m exceeds "MAX TX" (the number of sending transmission units), the process is terminated. If not, the process goes back to step S52.

Figure 18:
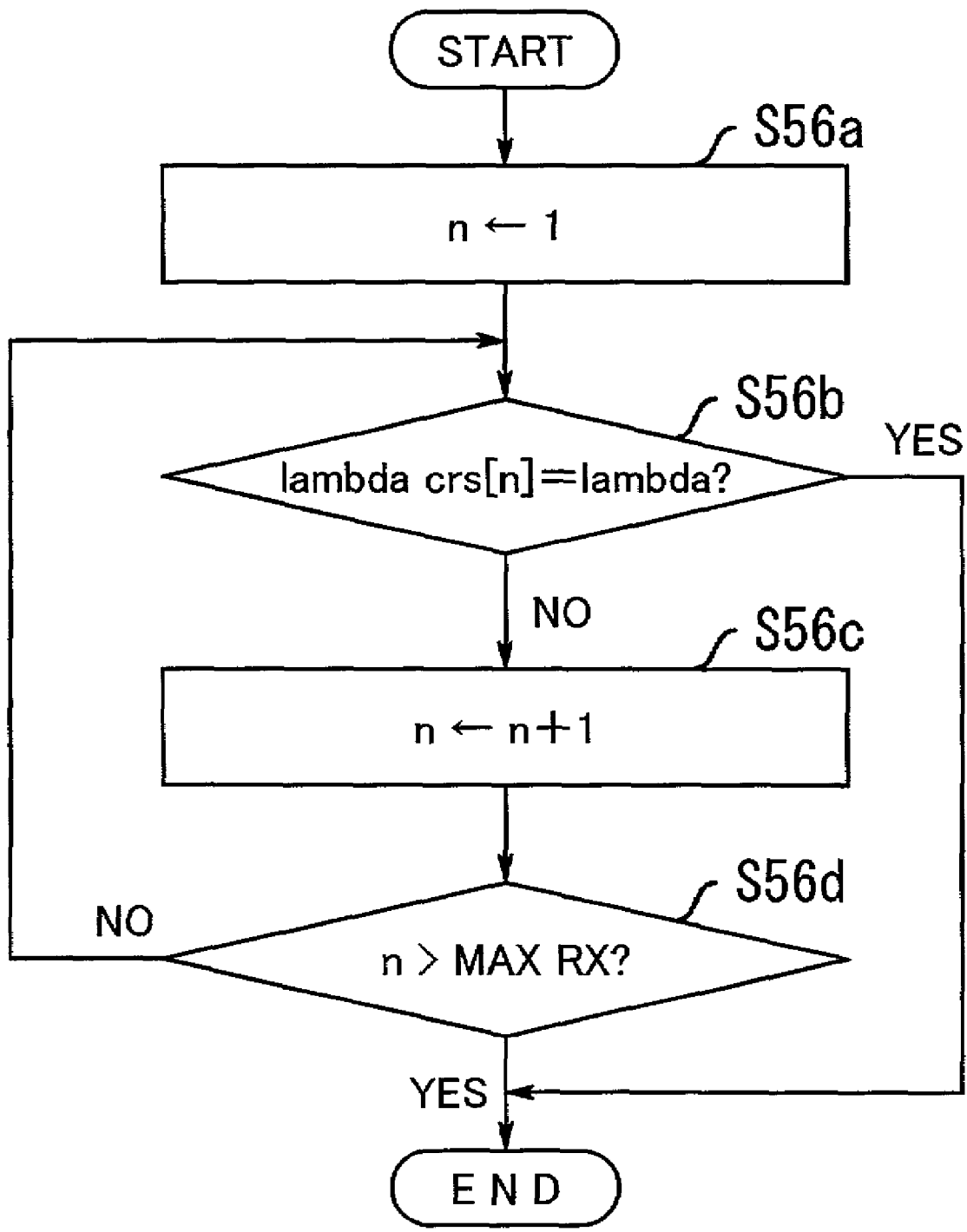
FIG. 18 is a flowchart of a process to check the usage status of wavelength resources.

FIG. 18 is a flowchart showing the details of the process called up at step S56 (FIG. 16). This process checks the current usage status of a particular optical wavelength as follows:

(S56a) The counter value n, which serves as an index pointing to a receiving transmission unit, is initialized to one.

(S56b) Scanning the existing connection management table T3, the command/response processor 3-2 checks whether the wavelength in question is already used by the n-th receiving transmission unit Rn. More specifically, it is tested whether the variable "lambda" agrees with the array element "lambda crs(n)." If they do not agree (i.e., the wavelength is not used), the process proceeds to step S56c. If they agree (i.e., the wavelength is used), the process terminates itself, returning "true" to the calling process.

(S56c) The command/response processor 3-2 increments the counter n by one to point to the next receiving transmission unit Rn.

(S56d) If the counter n exceeds "MAX RX" (the number of receiving transmission units), the process terminates itself, returning "false" to the calling process. If not, the process goes back to step S56b.

Figure 19:
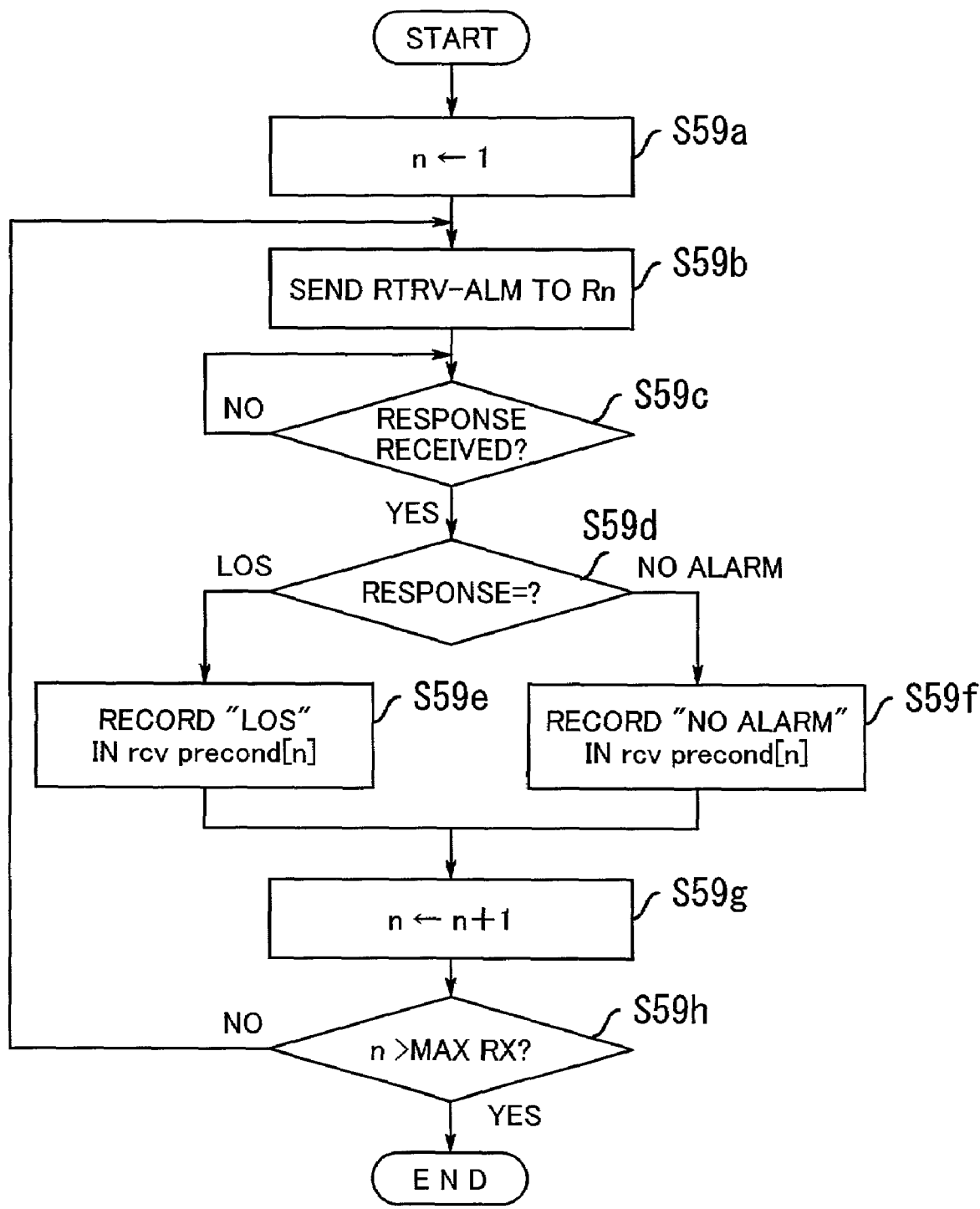
FIG. 19 is a flowchart of a status polling process which collects status information from receiving transmission units.

FIG. 19 is a flowchart showing the details of the process called up at step S59 (FIG. 17). This process performs polling of the status of receiving transmission units as follows:

(S59a) The counter value n is initialized to one.

(S59b) The command/response processor 3-2 sends a status polling command "RTRV-ALM" to the n-th receiving transmission unit Rn.

(S59c) The command/response processor 3-2 waits for a response from the transmission unit Rn of interest. If there is a response, it proceeds to step S59d.

(S59d) It is tested whether the received response is "LOS" or "No Alarm." If it is "LOS," then the process advances to step S59e. If it is "No Alarm," the process proceeds to step S59f.

(S59e) The "LOS" status is recorded in a relevant part of the temporary memory "rev precond[n]" which stores reception status of each receiving transmission unit.

(S59f) The "No Alarm" status is recorded in a relevant part of the temporary memory "rev precond[n]."

(S59g) The counter n is incremented by one.

(S59h) If the counter n exceeds "MAX RX" (the number of receiving transmission units), the process is terminated. If not, the process goes back to step S59b.

Figure 20:
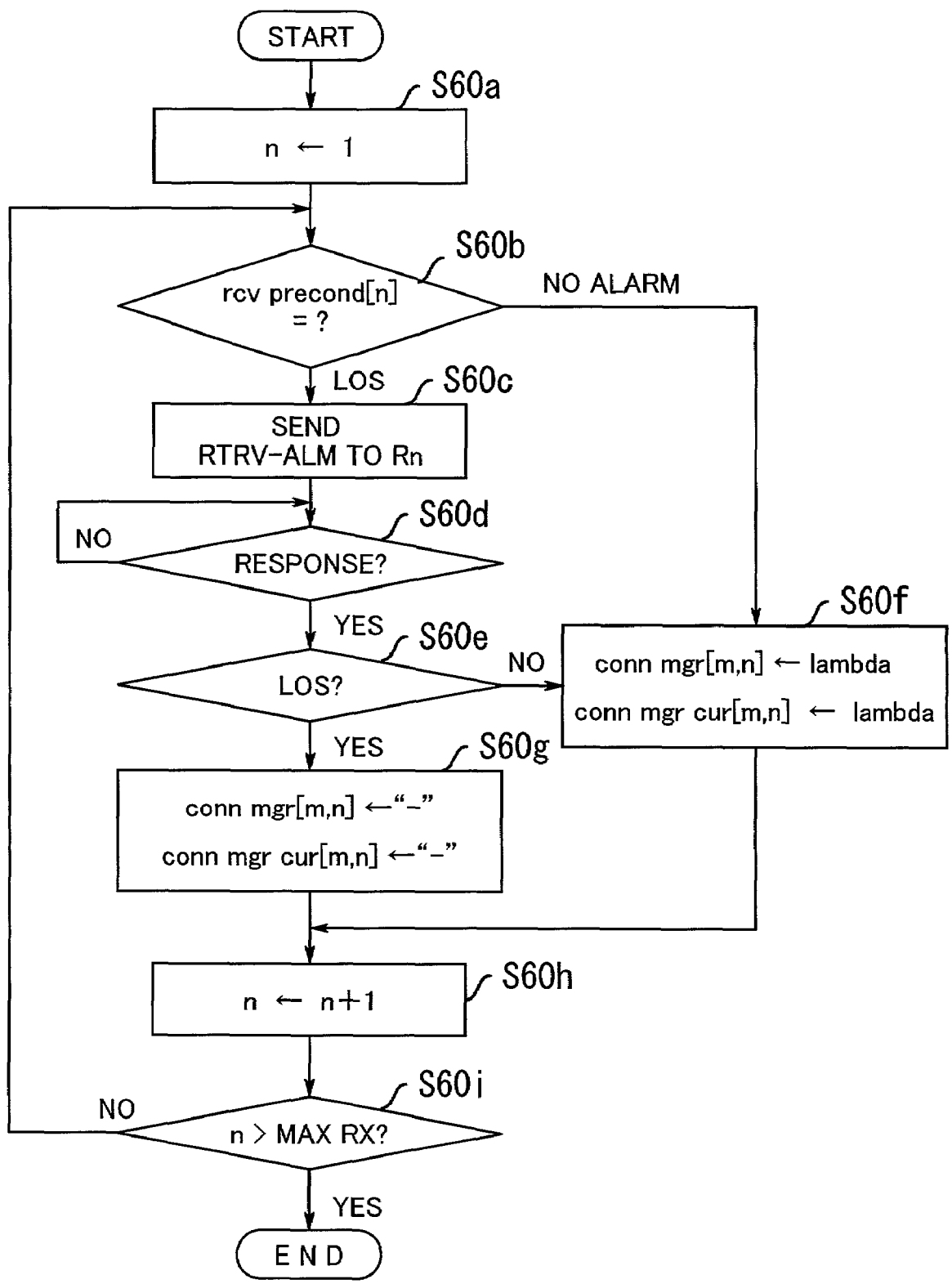
FIG. 20 is a flowchart of a process to fill out each entry of the connectability management table with a wavelength λx or a hyphen.

FIG. 20 is a flowchart showing the details of the process called up at step S60 (FIG. 17). This process fills out each entry of the connectability management table T1 with a wavelength value λx or a hyphen. Because the current management table T2 is created in a similar way, the following process includes the table T2.

(S60a) The counter value n is initialized to one.

(S60b) The temporary memory "rev precond[n]" stores the signal reception status of each receiving transmission unit. The command/response processor 3-2 examines the n-th record of this memory to check the reception status of the n-th transmission unit Rn. If the record shows "LOS," then the process advances to step S60c. If it is "No Alarm," the process branches to step S60f.

(S60c) The command/response processor 3-2 reissues RTRV-ALM to the transmission unit Rn.

(S60d) The command/response processor 3-2 waits for a response to the RTRV-ALM command. If there is a response from Rn, it proceeds to step S60e.

(S60e) If the response is "LOS," then the process advances to step S60g. If not, the process branches to step S60f.

(S60f) The command/response processor 3-2 writes the value of "lambda" into the cell (Sm, Rn) of both the connectability management table T1 and current management table T2. More specifically, it assigns "lambda" to "conn mgr[m, n]" and "conn mgr cur[m, n]."

(S60g) The command/response processor 3-2 writes a hyphen "-" into the cell (Sm, Rn) of both the connectability management table T1 and current management table T2. More specifically, it gives "-" to "conn mgr[m, n]" and "conn mgr cur[m, n]."

(S60h) The counter value n is incremented by one.

(S60i) If the counter n exceeds "MAX RX" (the number of receiving transmission units), the process is terminated. If not, the process goes back to step S60b.

In the way described above, the command/response processor 3-2 is designed to reconfirm the current status of a receiving transmission unit before updating the connectability management table T1 and current management table T2. Even if a "LOS" status is detected at step S60b, it does not immediately write a hyphen to the cell (Sm, Rn) of the tables T1 and T2, but reissues an RTRV-ALM command to Rn. If this attempt ends up with a "LOS" again, the cell (Sm, Rn) will be filled out with a hyphen. If the result is "No Alarm," the wavelength value λ is entered to that cell.

Figure 21:
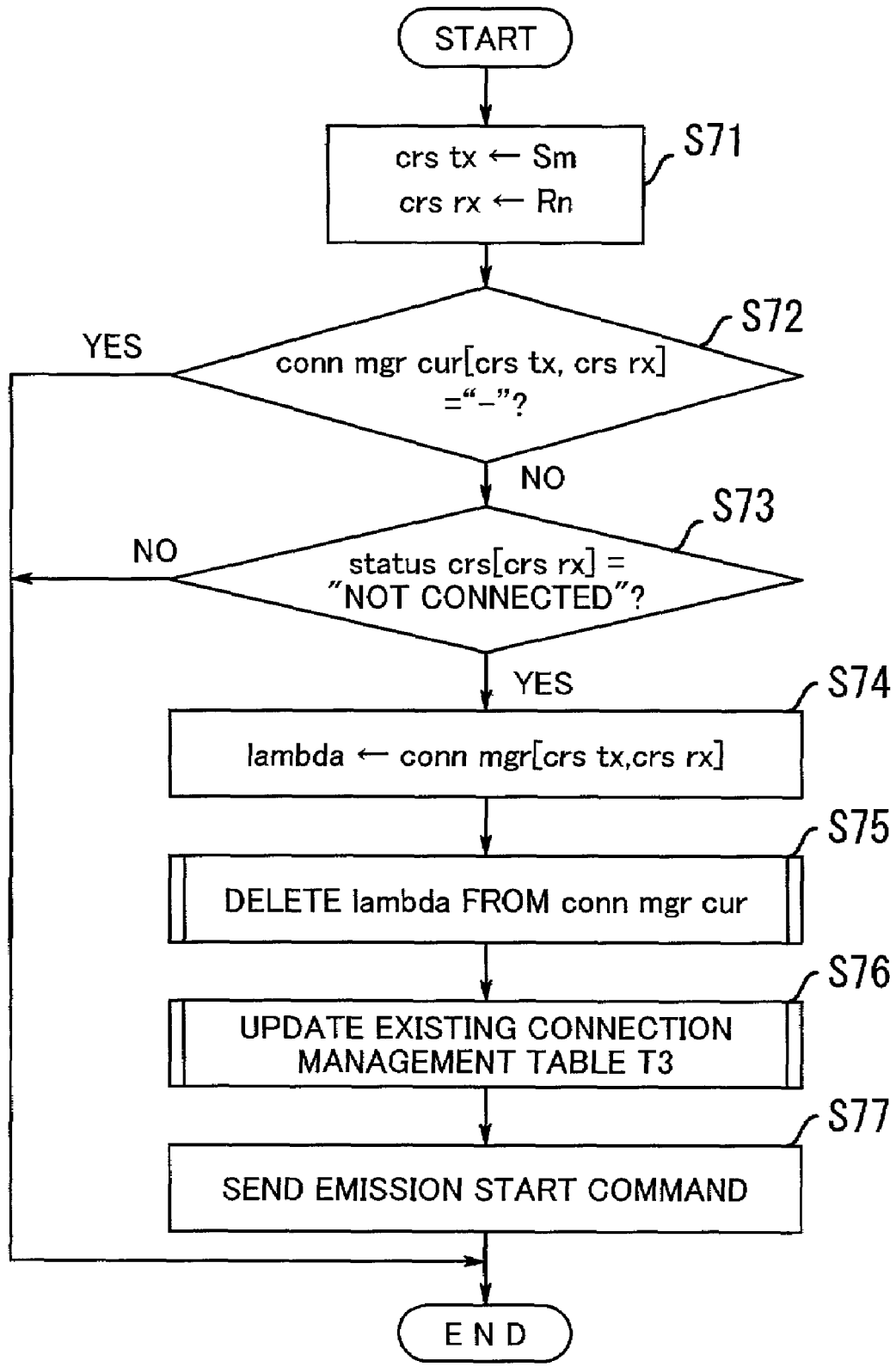
FIG. 21 is a flowchart of a process to set up a connection between transmission units.

Referring next to the flowchart of FIG. 21, the process of setting up a connection between two transmission units will be described below. This process is called up at step S44a (FIG. 14) to execute a connection command "ENT-NET-CRS:<TID>:A,B:<CTAG>:" to connect a sending transmission unit Sm with a receiving transmission unit Rn.

(S71) The command/response processor 3-2 sets parameters for the transmission unit pair Sm and Rn (specified by the command parameters A and B) that should be connected. That is, it assigns Sm to one parameter "crs tx" and Rn to another parameter "crs rx."

(S72) Consulting the current management table T2, the command/response processor 3-2 checks whether the specified transmission units Sm and Rn are connectable. More specifically, it examines whether the array element "conn mgr cur[crs tx, crs rx]" contains a hyphen. If so, it means that they are not connectable, and the process should be terminated unsuccessfully. If it is not a hyphen, the transmission units Sm and Rn are connectable, and the process advances to step S73, accordingly.

(S73) Scanning the existing connection management table T3, the command/response processor 3-2 checks whether there is an existing connection between the two transmission units Sm and Rn. More specifically, it tests whether the array element "status crs[crs rx]" is set to "Not Connected." If there is a connection, the process is terminated. If not, the process advances to step S74.

(S74) Consulting the connectability management table T1, the command/response processor 3-2 obtains the output wavelength "lambda" for use in connecting transmission units Sm and Rn. More specifically, it reads out the relevant element of the array "conn mgr cur[crs tx, crs rx]" and assigns that value to the variable "lambda."

(S75) The command/response processor 3-2 modifies the current management table T2, replacing all entries having the value of "lambda" with hyphens. The details of this step will be described later in FIG. 22.

(S76) The command/response processor 3-2 further updates the existing connection management table T3 by assigning the identifier of the sending transmission unit to "status crs[n]," as well as entering the allocated wavelength "lambda" to "lambda crs[n]."

(S77) The command/response processor 3-2 commands the sending transmission unit Sm to emit an optical signal with the wavelength of "lambda."

Figure 22:
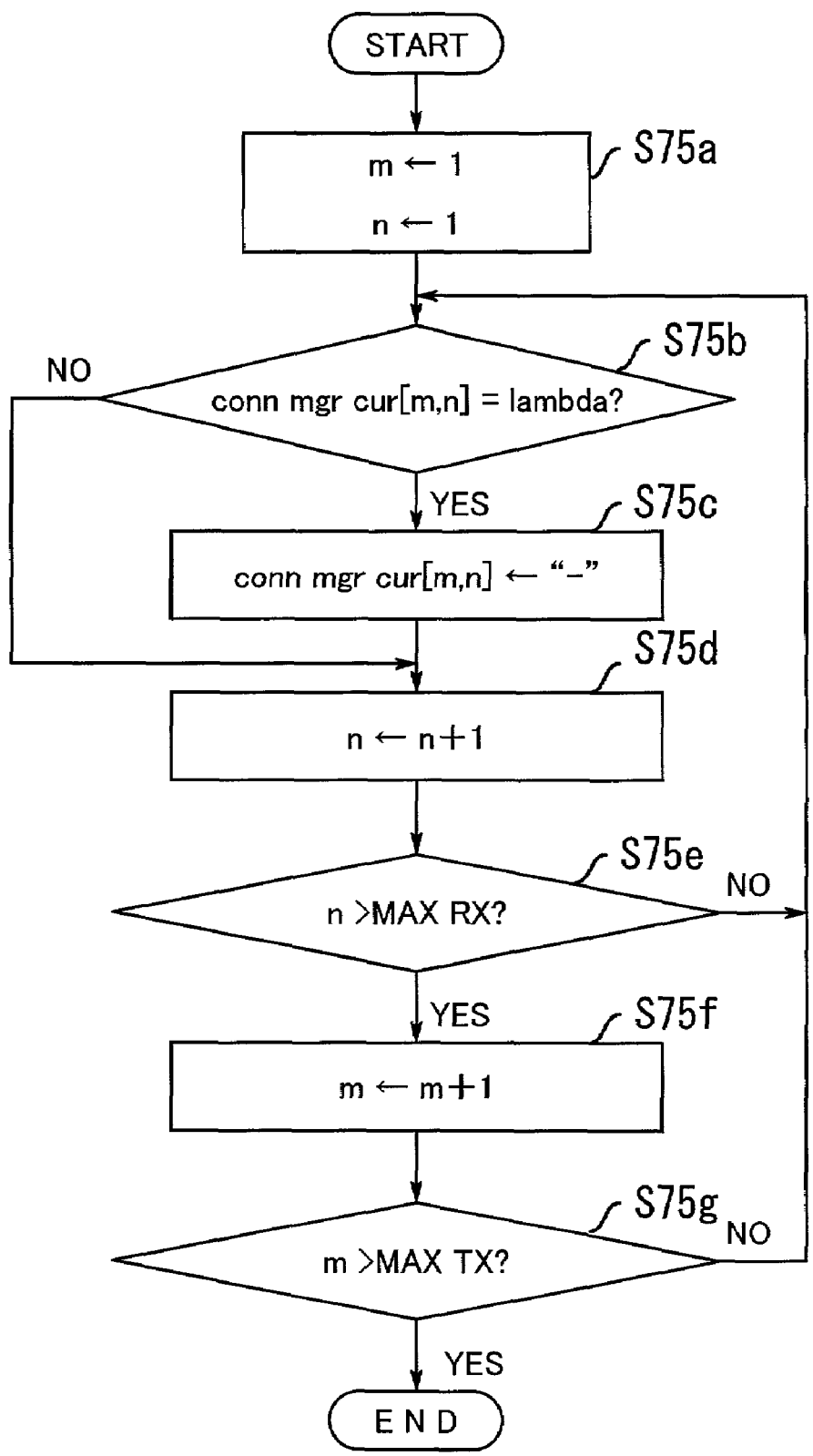
FIG. 22 is a flowchart of a process to delete a particular wavelength from the current management table.

FIG. 22 is a flowchart showing the details of step S75 (FIG. 21), which deletes a particular wavelength from the current management table T2.

(S75a) The counter values n and m are initialized to one.

(S75b) The command/response processor 3-2 determines whether the cell (Sm, Rn) of the current management table T2 contains the same value as "lambda." More specifically, it extracts the value of "conn mgr cur[m, n]" and compares it with "lambda." If they agree with each other, the process advances to step S75c. If not, the process skips to step S75d.

(S75c) To avoid further use of the wavelength, the command/response processor 3-2 fills out the cell (Sm, Rn) of the current management table T2 with a hyphen. More specifically, it assigns "-" to "conn mgr cur[m, n]."

(S75d) The counter value n is incremented by one.

(S75e) If the counter n exceeds "MAX RX" (the number of receiving transmission units), the process advances to step S75f. If not, the process goes back to step S75b.

(S75f) The counter value m is incremented by one.

(S75g) If the counter m exceeds "MAX TX" (the number of sending transmission units), the process is terminated. If not, the process goes back to step S75b.

Referring next to the flowchart of FIG. 23, the process of releasing a connection between two transmission units will be described below. This process is called up at step S44b (FIG. 14) to execute a command "DLT-NETCRS:<TID>:A, B:<CTAG>:."

(S81) The command/response processor 3-2 sets parameters for the transmission units Sm and Rn (specified by the command parameters A and B, respectively) that should be disconnected. That is, it assigns Sm to one parameter "crs tx" and Rn to another parameter "crs rx."

(S82) Scanning the existing connection management table T3, the command/response processor 3-2 checks whether there is an existing connection between the two transmission units Sm and Rn. More specifically, it examines whether the array element "status crs[crs rx]" is set to "Connected." If there is no such connection, the process is terminated. If there is, the process advances to step S83.

(S83) The command/response processor 3-2 calls another process to restore the current management table T2 to the state before that connection was made. The details of this step will be described later in FIG. 24.

(S84) The command/response processor 3-2 updates the existing connection management table T3 to include the released connection. More specifically, it assigns "Not Connected" to "status crs[n]" and a hyphen to "lambda crs[n]."

(S85) The command/response processor 3-2 sends an emission stop command to the sending transmission unit Sm, thus terminating the transmission of the optical signal.

(S86) The command/response processor 3-2 initiates the process of FIGS. 16 and 17 to update the connectability management table T1. The current management table T2 is also updated concurrently. This step S86 allows the tables T1 and T2 to take in information about new units, if any.

Figure 23:
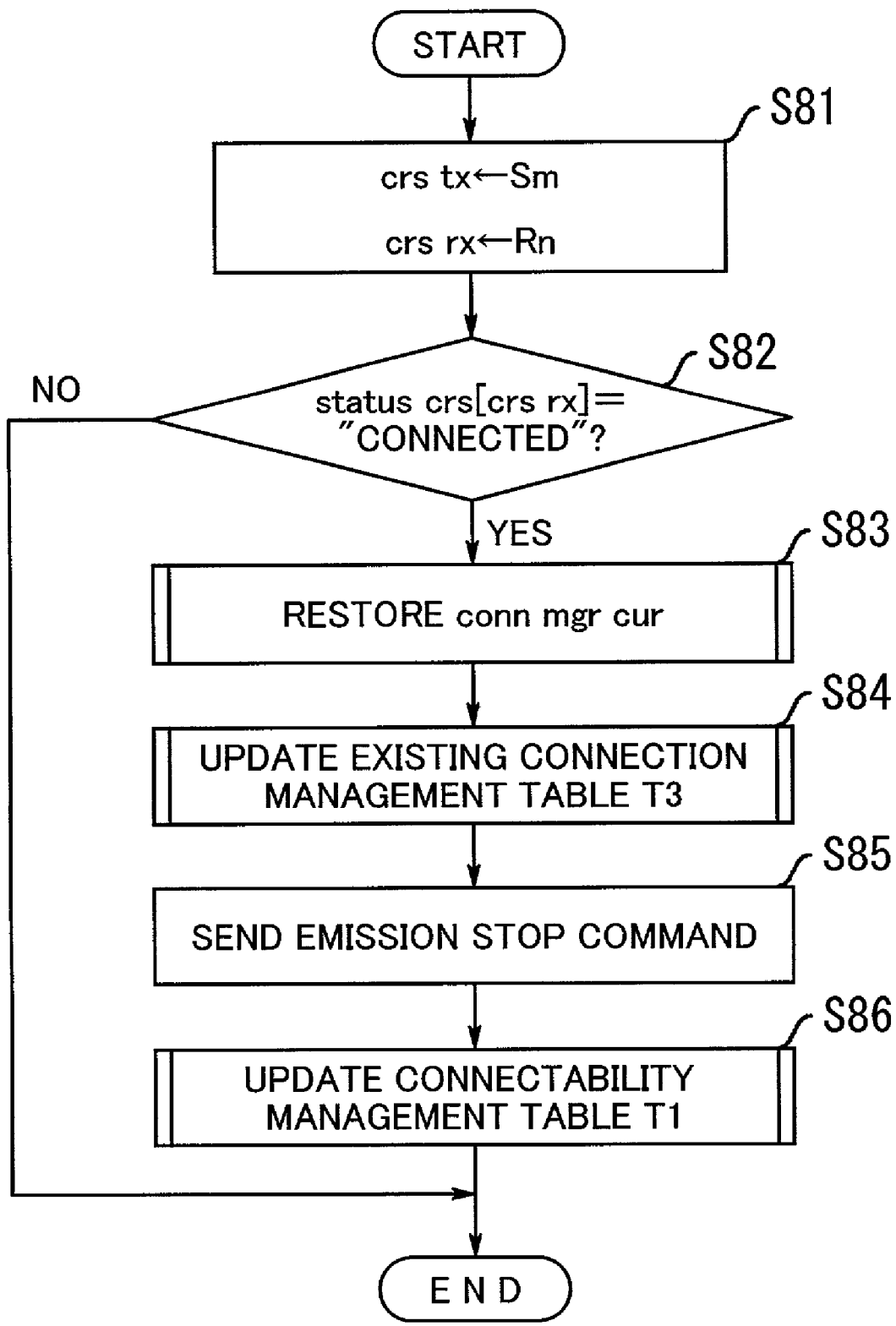
FIG. 23 is a flowchart of a process to release an existing connection between transmission units.
Figure 24:
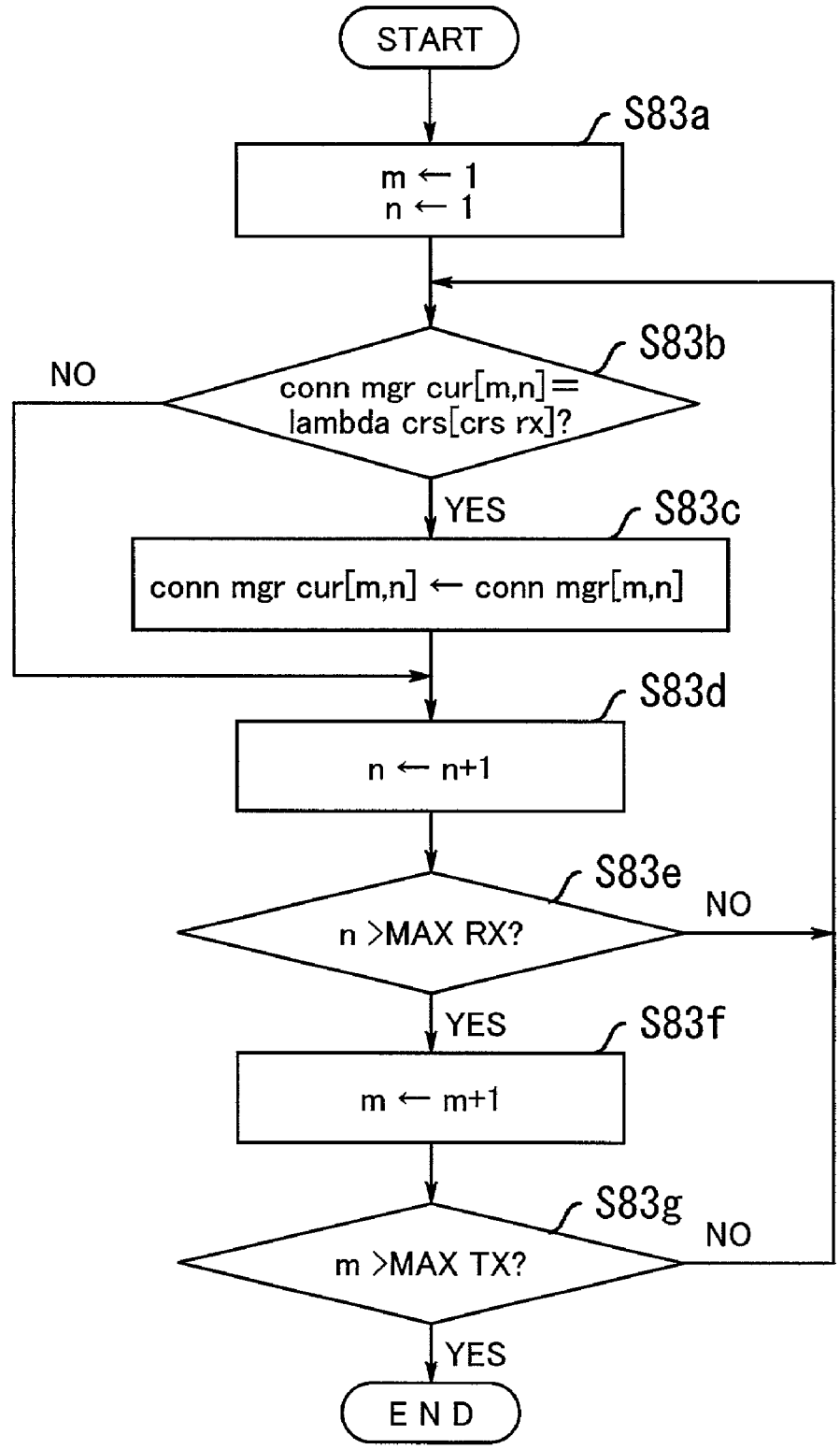
FIG. 24 is a flowchart of a process to restore the current management table.

FIG. 24 is a flowchart showing the details of step S83 (FIG. 23). This process restores the current management table T2 as follows:

(S83a) The counter values n and m are initialized to one.

(S83b) The connectability management table T1 stores a wavelength λx in association with the transmission unit pair (Sm, Rn). The command/response processor 3-2 determines whether that wavelength λx agrees with the wavelength that has been used by the specified receiving transmission unit. More specifically, it tests whether "conn mgr cur[m, n]" equals "lambda crs[crs rx]." If so, the process advances to step S83c. If not, the process skips to step S83d.

(S83c) The command/response processor 3-2 restores the cell (Sm, Rn) of the current management table T2 by writing the wavelength λx thereto. More specifically, it substitutes "conn mgr[m, n]" for "conn mgr cur[m, n]."

(S83d) The counter value n is incremented by one.

(S83e) If the counter n exceeds "MAX RX" (the number of receiving transmission units), the process advances to step S83f. If not, the process returns to step S83b.

(S83f) The counter value m is incremented by one.

(S83g) If the counter m exceeds "MAX TX" (the number of sending transmission units), the process is terminated. If not, the process goes back to step S83b.

Figure 25:
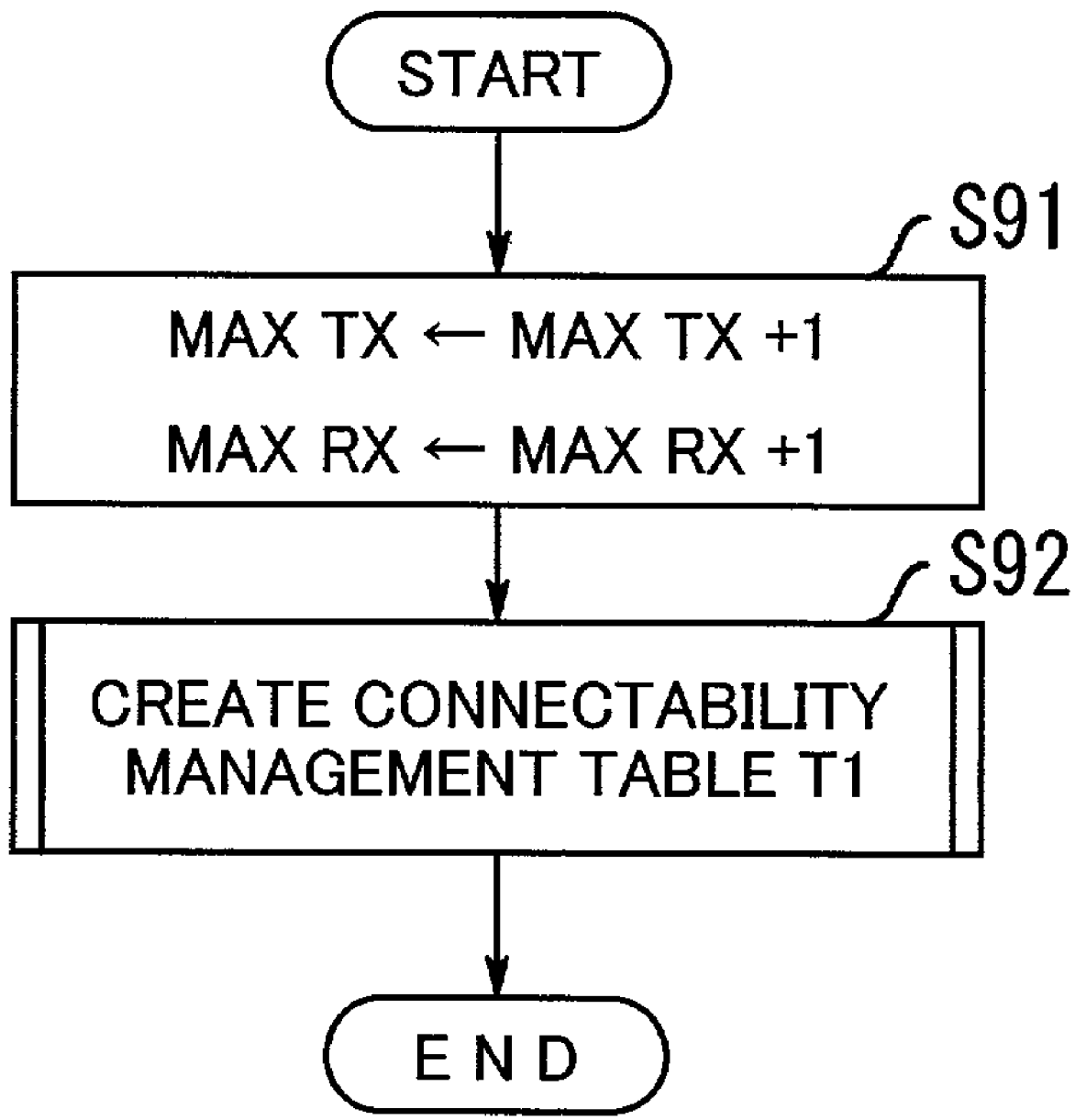
FIG. 25 is a flowchart of a process to add a new transmission unit.

Referring next to the flowchart of FIG. 25, the process of adding a new transmission unit to the system will be described below. This process is called up at step 44d (FIG. 14) to execute a command "ADD-NETTBL:<TID>::<CTAG>:."

(S91) Since a new transmission unit is added, the parameters representing the unit count should be updated. Normally, the number of sending transmission units and the number of receiving transmission units are increased simultaneously. That is, the parameters "MAX TX" and "MAX RX" are both incremented by one.

(S92) The command/response processor 3-2 calls the process of FIGS. 16 and 17 to update the connectability management table T1 so that it will include the newly added unit.

The above discussion will now be summarized as follow. According to one aspect of the present invention, the proposed optical communications system has transmission units with command-controlled output wavelengths and a WDM unit having output ports arranged for outgoing signals with different wavelength. The monitoring station controls connections and operations, and the WDM unit provides optical cross-connects accordingly. The present invention thus eliminates the need for costly optical switch modules. Instead, the proposed system controls the output wavelength of each sending transmission unit, thereby enabling the network as a whole to serve as extended optical cross-connecting facilities. This feature of the present invention contributes to the construction of more cost-effective and flexible WDM networks.

According to another aspect of the invention, the proposed system manages connections between transmission units, together with wavelengths used therefor, in a centralized manner by using a connectability management table T1, a current management table T2, and an existing connection management table T3. This feature makes network management tasks more efficient.

According to yet another aspect of the invention, the proposed system configures optical cross-connects to provide a signal paths between a specified sending transmission unit and receiving transmission unit. It is not necessary for maintenance people to explicitly specify which wavelength to use.

According to still another aspect of the invention, the management tables are automatically updated when the connections may be affected by a new transmission unit added to the network. This feature of the present invention helps network administrators perform their tasks.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wavelength-division multiplexed (WDM) optical communications system, comprising:
(a) a plurality of transmission units, each comprising:
  a variable wavelength setting unit which varies the wavelength of an outgoing optical signal according to an external command and provides an output wavelength description indicating which wavelengths are supported,
  an optical signal transmitter which transmits the outgoing optical signal with the wavelength set by said variable wavelength setting unit, and
  an optical signal receiver which receives an incoming optical signal with a single particular wavelength, the incoming optical signal having been produced through wavelength-division multiplexing and de-multiplexing processes;
(b) a WDM unit, comprising:
  a WDM controller which controls multiplexing and de-multiplexing of optical signals,
  a plurality of optical input ports;
  a plurality of optical output ports;

an optical multiplexer coupled to the plurality of optical input ports for combining a plurality of incoming optical signals with different wavelengths, and an optical de-multiplexer coupled to the plurality of optical output ports for splitting the output of the optical multiplexer into a plurality of outgoing optical signals with different wavelengths, thereby supplying each of the optical output ports with an outgoing optical signal with a particular signal wavelength;

(c) a monitoring station, comprising:

an administration controller which manages administrative data concerning connections and operations of said transmission units, and an optical cross-connect controller which controls optical cross-connects in said WDM unit by sending the external command to said variable wavelength setting unit to set up connections between said plurality of transmission units according to the administrative data managed by said administration controller.

2. The WDM optical communications system according to claim 1, wherein said administration controller comprises:

a connectability management table which shows whether each pair of transmission units is physically connectable;

a current connectability management table which is used when said WDM optical communications system is in operation to show whether each pair of transmission units is connectable; and an existing connection management table which shows all existing connections between said transmission units, whereby the connections and operations of said transmission units are controlled in a centralized fashion.

3. The WDM optical communications system according to claim 2, wherein said administration controller creates the connectability management table by:

requesting, before said WDM optical communications system starts operation, one of said transmission units to emit an optical signal with a wavelength specified in the output wavelength description that has been received from said variable wavelength setting unit;

obtaining reception status information by determining whether the other transmission units are receiving the optical signal with the specified wavelength; and based on the obtained reception status information, identifying connectability between every pair of transmission units and wavelengths to be used for connections.

4. The WDM optical communications system according to claim 2, wherein said administration controller creates and maintains the existing connection management table to manage every existing connection between said transmission units by:

registering a record of a new connection established, the record showing a sending transmission unit and a wavelength used in the new connection; and removing a relevant record when an exiting connection is released.

5. The WDM optical communications system according to claim 2, wherein said optical cross-connect controller executes a connection request command for setting up a connection between a specified pair of transmission unit by:

consulting the current connectability management table and the existing connection management table to check whether the specified transmission units are connectable; and if the specified transmission units are found to be connectable, commanding one of the specified transmission units to emit an optical signal with the wavelength determined from the current connectability management table.

6. The WDM optical communications system according to claim 2, wherein said optical cross-connect controller executes a connection release command for releasing a connection between a specified pair of transmission unit by:

consulting the current connectability management table and the existing connection management table to check whether the specified transmission units are being connected; and if the specified transmission units are found to be connected, commanding one of the specified transmission units to stop emission of an optical signal.

7. The WDM optical communications system according to claim 2, wherein said administration controller updates the connectability management table and current connectability management table when releasing an existing connection between said transmission units.

* * * * *

UNITED STATES PATENT AND TRADEMARK OFFICE
CERTIFICATE OF CORRECTION

PATENT NO. : 7,116,904 B2  Page 1 of 1
APPLICATION NO. : 10/103896
DATED : October 3, 2006
INVENTOR(S) : Kouji Maki et al.

It is certified that error appears in the above-identified patent and that said Letters Patent is hereby corrected as shown below:

Column 18, line 12, change "exiting" to --existing--.

Signed and Sealed this

Thirteenth Day of February, 2007

JON W. DUDAS
*Director of the United States Patent and Trademark Office*